United States Patent [19]

Kuwata

[11] Patent Number: 5,784,488
[45] Date of Patent: Jul. 21, 1998

[54] IMAGE PROCESSING METHOD AND SYSTEM

[75] Inventor: Naoki Kuwata, Nagano-ken, Japan

[73] Assignee: Seiko Epson Corporation, Tokyo, Japan

[21] Appl. No.: 364,830

[22] Filed: Dec. 27, 1994

[30] Foreign Application Priority Data

Dec. 24, 1993 [JP] Japan ..................... 5-327647
Sep. 20, 1994 [JP] Japan ..................... 6-225212

[51] Int. Cl.$^6$ .............. H04N 1/40; G06K 9/34; G06K 9/36; G06K 9/46
[52] U.S. Cl. ............... 382/176; 358/462; 358/467; 358/455; 382/237
[58] Field of Search ................ 358/462, 456, 358/464, 459, 519, 518, 534, 467, 455, 433; 382/164, 176, 190, 195, 237, 299

[56] References Cited

U.S. PATENT DOCUMENTS

| | | | |
|---|---|---|---|
| 4,547,811 | 10/1985 | Ochi et al. | 358/466 |
| 4,577,235 | 3/1986 | Kannapell et al. | |
| 4,595,956 | 6/1986 | Kawamura et al. | 358/459 |
| 4,668,995 | 5/1987 | Chen et al. | |
| 4,709,274 | 11/1987 | Tanioka | 358/455 |
| 4,710,822 | 12/1987 | Matsunawa | |
| 4,893,188 | 1/1990 | Murakami et al. | 358/456 |
| 4,953,012 | 8/1990 | Abe | 358/519 |
| 4,996,603 | 2/1991 | Kanemitsu et al. | 358/462 |
| 5,018,024 | 5/1991 | Tanioka | 358/457 |
| 5,331,442 | 7/1994 | Sorimachi | 358/462 |
| 5,379,130 | 1/1995 | Wang et al. | 358/462 |
| 5,392,362 | 2/1995 | Kimura et al. | 382/173 |
| 5,459,587 | 10/1995 | Fukushima | 358/462 |
| 5,539,843 | 7/1996 | Murakami et al. | 382/270 |
| 5,550,647 | 8/1996 | Koike | 358/462 |
| 5,587,808 | 12/1996 | Hagihara et al. | 358/462 |
| 5,617,216 | 4/1997 | Wada | 358/298 |
| 5,617,485 | 4/1997 | Ohuchi et al. | 382/176 |

FOREIGN PATENT DOCUMENTS

| | | | |
|---|---|---|---|
| 58-3374 | 1/1983 | Japan | H04N 1/40 |
| 58-115975 | 7/1983 | Japan | H04N 1/40 |
| 5-114045 | 5/1993 | Japan | G06K 9/20 |

Primary Examiner—Kim Yen Vu
Assistant Examiner—Kimberly A. Williams
Attorney, Agent, or Firm—Oliff & Berridge, PLC

[57] ABSTRACT

An image processing system and method for converting an input image having continuous tone regions and binary regions into a binary output image includes a block evaluation system that generates a plurality of characteristic values for each block of the input image, and determines a block attributes for each block based on the plurality of characteristic values. The image processing system and method converts the input image into the binary output image on a block-by-block basis using one of a binary region conversion process or a continuous tone region conversion process, wherein the conversion process for each block is selected based on the determined block attribute. In addition, the image processing system and method corrects the determined block attribute based on the block attributes of each block and other blocks surrounding each block. Further, the image processing system and method detects when state transitions between block attributes of adjacent blocks occur, such that the conversion process selection is further controlled by the detected state transitions, based on either the block attributes for each block and other blocks surrounding each block, or the distribution of black, white, and gray pixels in each block. Finally, in the image processing system and method, the block attribute correction and the state transition detection can be used together.

19 Claims, 27 Drawing Sheets

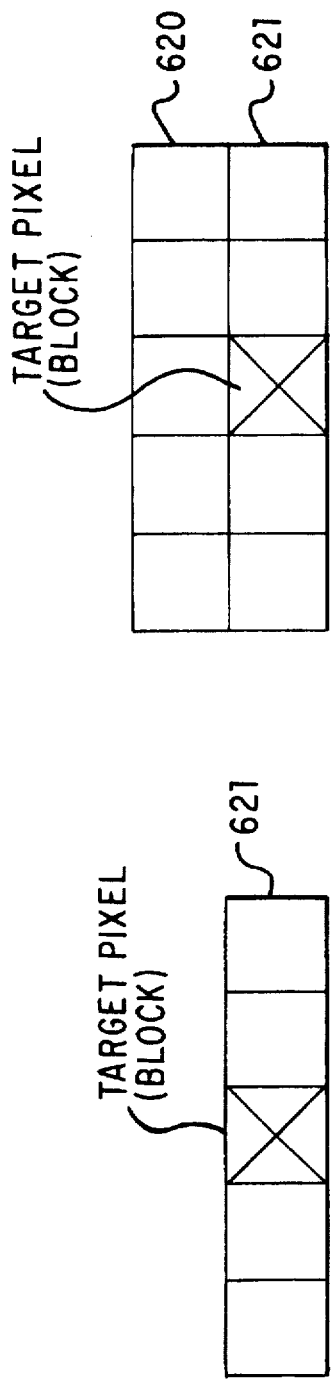
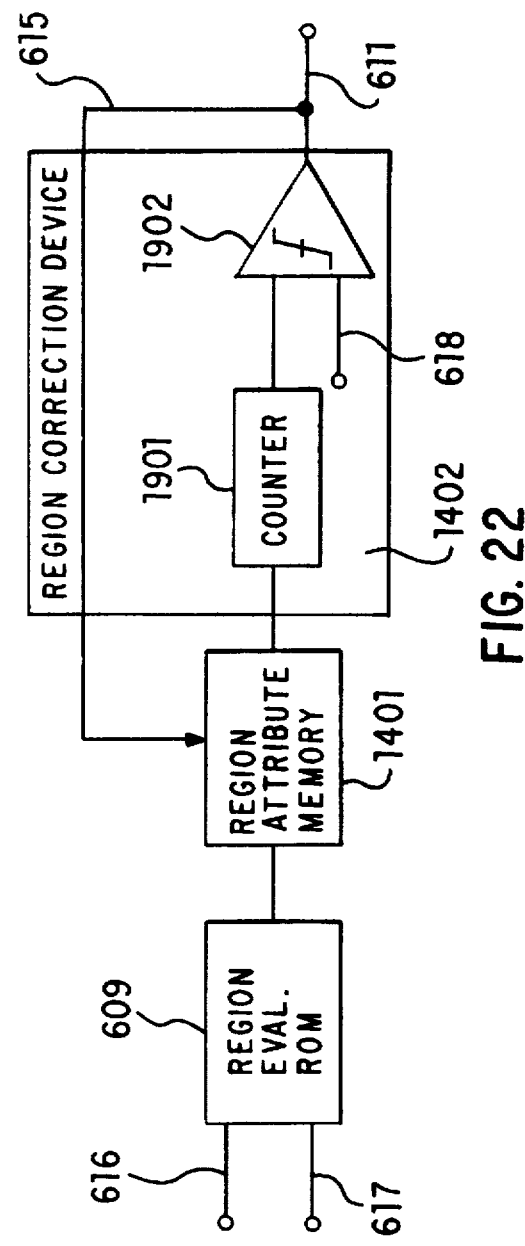

1

IMAGE PROCESSING METHOD AND SYSTEM

BACKGROUND OF THE INVENTION

1. Field of the Invention

This invention relates to an image processing method and system which conduct a density conversion process in order to store in memory, print, or display an image, input in multiple density levels, in which characters and photographs are intermixed.

2. Description of Related Art

Conventionally, with image processing systems such as scanners, photocopy machines and facsimile machines which can only output binary images, a simple binary conversion process is used on binary regions, such as characters, line drawings and the like, in order to make the edges of these regions sharp and clear in the binary output image. An error diffusion method as a continuous tone conversion process is used on continuous tone (i.e., gray-scale) regions, such as photographs, in order to generate the plurality of different image density levels or density gradations in the binary output image. However, there are a large number of documents, such as catalogs and the like, within which binary regions, such as characters, line drawings and the like, are intermixed with continuous tone regions, such as photographs. In these documents, it is necessary to evaluate each region in the document and to conduct the appropriate conversion process on each evaluated region to generate the binary output image.

To solve this disadvantage, a method is proposed in Japanese unexamined patent publication 58-3374. In this reference, the input image is divided into blocks.

The blocks are evaluated by finding the difference between the maximum image density and the minimum image density in each block. In Japanese unexamined patent publication 58-115975, another method is used. In this reference, the blocks are evaluated by finding the edge density of each block.

However, in these two prior art methods, the region evaluation precision is low, because only one characteristic amount is used when evaluating the blocks. In addition, another disadvantage is that erroneously evaluated regions stand out in the binary output image because no correction method for correcting the evaluation erroneously evaluated regions has been provided.

SUMMARY OF THE INVENTION

This invention thus provides an image processing method and an image processing system which conduct a density conversion process on an image having intermixed binary and gray-scale regions, in order to store to memory, or to print or display the converted image.

This invention further provides an image processing method and image processing system wherein the region evaluation precision is improved by using two characteristic amounts, specifically the number of black pixels and the maximum density difference.

This invention also provides an image processing method and image processing system wherein the region evaluation precision is further improved by correcting the results of the target block or pixel evaluation by referring to the results of the target block or pixel evaluation for surrounding blocks or pixels following the target block or pixel evaluation.

This invention additionally provides an image processing method and image processing system wherein erroneously evaluated portions are prevented from standing out in the binary output image by detecting blocks in which erroneous evaluations are easily produced and switching the conversion method within this block or switching the conversion method based on the pixel density of this block relative to the results of the evaluation of the surrounding blocks.

The density conversion process takes the mixed binary and continuous tone input image and outputs a binary-only output image suitable for printing, displaying or transmitting on binary-only devices, such as a binary printer, a monochrome monitor and the like.

In each of the preferred embodiments, the image processing system and method of this invention extract two characteristic amounts for each region or block of the multiple density-level input image, namely the number of black pixels (or alternately the number of white pixels) and the maximum density difference, and evaluate each region to determine whether the region is a binary region or a continuous tone region using the two characteristic amounts. Therefore, the region evaluation precision is increased compared to the prior art region evaluation methods that use only one characteristic amount. In addition, both characteristic amounts are determined using simple processes, so only a short processing time is needed and can be implemented in hardware without difficulty.

In addition, in some of the preferred embodiments, correction of erroneous region evaluations is performed, after the region is evaluated, based on the region attributes of surrounding regions, where the regions are formed of blocks or individual pixels. These attributes indicate whether a region is a binary region or a continuous tone region, with the binary region attribute being a logic high signal (hereinafter a "1") and the continuous tone region attribute being a logic low signal (hereinafter a "0"), for example. Thus, it is possible to further enhance the precision of the region evaluation. Further, a pattern matching method or a majority determination method is used as the correction method, making it possible to obtain sufficient results with a simple hardware structure.

Furthermore, in other ones of the preferred embodiments, after the region evaluation process is complete, the existence or lack of existence of a state transition between adjacent regions is detected, wherein a state transition occurs when the region attribute changes from binary to continuous tone or vice versa. In regions where no state transition exists, the binary output signals are generated for binary regions and for continuous tone regions for all pixels in each region, based on the region evaluation results. In regions where a state transition exists, switching between the binary output signals generated by the binary conversion process and the continuous tone conversion process for the region having the state transition is performed based on either the region attributes of the surrounding blocks or the state transition. Therefore, it is possible to keep errors from standing out in the binary output image.

In addition, in some of the preferred embodiments, after the correction of erroneous region evaluations has been completed, the attribute of the target region is corrected based on the attributes of the surrounding region, and then the existence or lack of existence of a state transition between adjacent regions is detected. In regions where it is determined that no state transition exists, the binary output signals are generated by either the binary conversion process or the continuous tone conversion process for all pixels in the region based on the region evaluation correction results. In regions where a state transition exists, switching between the binary output signals generated by the binary conversion process and the continuous tone conversion process in the region having the state transition is performed based on either the corrected attributes of the surrounding regions or the pixel density of the corrected region having the state transition. By this means, it is possible to make the binary output image cleaner.

One embodiment of the preferred binary output image signal switching method of this invention comprises a characteristic amount extraction process that extracts a plurality of characteristic amounts contained in the input image; a region evaluation process that evaluates each region as one of a binary region or a continuous tone region based on the plurality of characteristic amounts extracted by the characteristic amount extraction process; and a signal selection process that, based on the evaluation results of the region evaluation process, outputs a binary output image signal converted from the input image by either the binary conversion process or the continuous tone conversion process.

Another embodiment of the preferred image signal switching method of this invention comprises a characteristic amount extraction process that extracts a plurality of characteristic amounts contained in the input image; a region evaluation process that evaluates each region as one of a binary region or a continuous tone region based on the plurality of characteristic amounts extracted by the characteristic amount extraction process; and a signal selection process that, based on the evaluation results of the region evaluation process, detects whether or not certain blocks of pixels in the input image are in a state of transition between the binary region and the continuous tone region relative to surrounding blocks, outputs a binary output image signal converted from the input image by either the binary conversion process or the continuous tone conversion process based on the evaluation results of the region evaluation process relative to all pixels in the specific block when no such state transition exists, and switches between the binary conversion process and the continuous tone conversion process based on the state transition in the specific block when such a state transition exists.

Yet another embodiment of the preferred image signal switching method of this invention comprises a characteristic amount extraction process that extracts a plurality of characteristic amounts contained in the input image; a region evaluation process that evaluates each region as one of a binary region or a continuous tone region based on the plurality of characteristic amounts extracted by the characteristic amount extraction process; and a region evaluation correction process that corrects the evaluation results of the region evaluation process.

One preferred embodiment of the image processing system of this invention comprises a density conversion means for converting the density of the multiple density level input image, a characteristic amount extraction means for extracting a plurality of characteristic amounts contained by the input image, a region evaluation means for evaluating each region as one of the binary region or the continuous tone region on the basis of the plurality of characteristic amounts extracted by the characteristic amount extraction means, and a signal selection means for switching between binary output image signals generated by either the binary conversion process or the continuous tone conversion process based on the evaluation results of the region evaluation means.

Another preferred embodiment of the image processing system of this invention comprises a density conversion means for converting the density of the multiple density level input image, a characteristic amount extraction means for extracting a plurality of characteristic amounts contained by the input image, a region evaluation means for evaluating each region as one of the binary region or the continuous tone region on the basis of the plurality of characteristic amounts extracted by the characteristic amount extraction means, region evaluation correction means for correcting the region evaluation, and a signal selection means for switching between binary output image signals generated by either the binary conversion process or the continuous tone conversion process based on the evaluation results of the region evaluation means.

Yet another preferred embodiment of the image processing system of this invention comprises a density conversion means for converting the density of the multiple density level input image, a characteristic amount extraction means for extracting a plurality of characteristic amounts contained by the input image, a region evaluation means for evaluating each region as one of the binary region or the continuous tone region on the basis of the plurality of characteristic amounts extracted by the characteristic amount extraction means, state transition detecting means for detecting, based on the evaluation results of the region evaluation process, whether or not certain blocks of pixels in the input image are in a state of transition between the binary region and the continuous tone region relative to surrounding blocks, and a signal selection means for selectively switching between the binary conversion process and the continuous tone conversion process based on the evaluation results of the region evaluation process relative to all pixels in the specific block when no such state transition is detected by the detection means, and for selectively switching between the binary conversion process and the continuous tone conversion process based on the state transition in the specific block when such a state transition exists.

These and other features and advantages of the invention are described in or apparent from the following detailed description of the preferred embodiments.

BRIEF DESCRIPTION OF THE DRAWINGS

The invention will be described in conjunction with the following drawings in which like reference numerals designate like elements and wherein:

FIGS. 21A and 21B illustrate a second preferred embodiment of the region correcting step of FIG. 12;

FIG. 22 is a block diagram of a third preferred embodiment of region correction device of FIG. 15;

DETAILED DESCRIPTION OF PREFERRED EMBODIMENTS

In the following preferred embodiments, the input images have both binary image portions, such as characters or line art, and continuous tone portions, such as photographs. In the input images, the input image signals have 256 different density levels (0–255), where white is indicated by a density value of 255 and black is indicated by a density value of 0. In the output images, the binary output signals have density levels of either 0 or 1, where white is indicated by a density value of 1 and black is indicated by a density value of 0.

Figures 1, 5A, 5B:
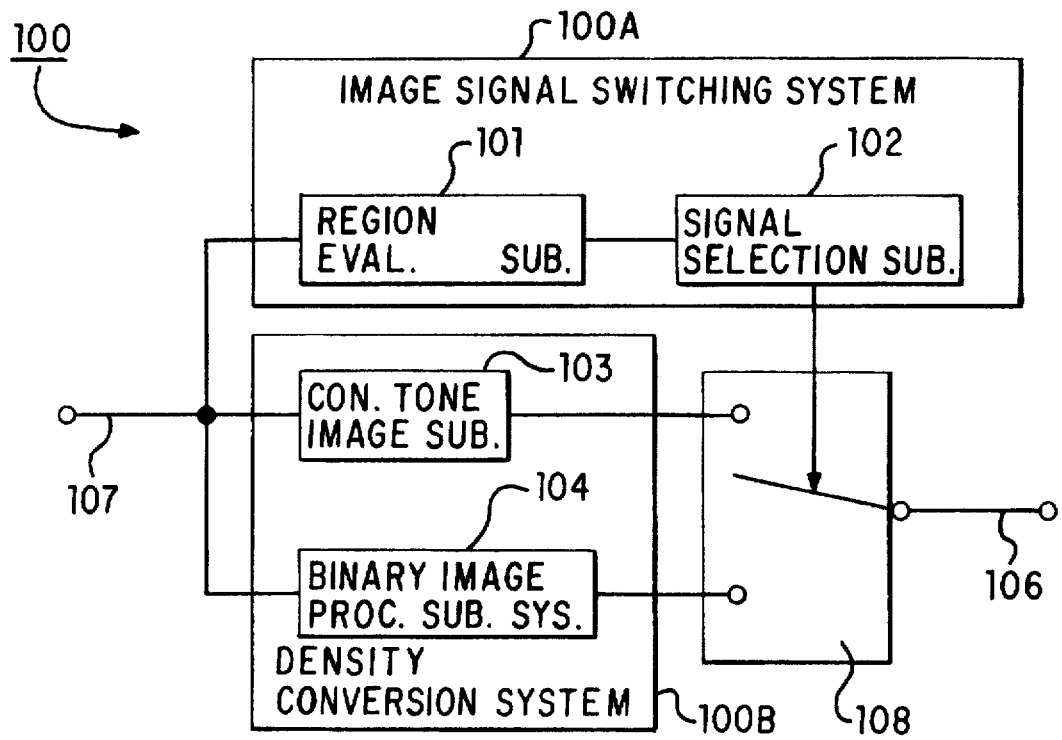
FIG. 1 is a block diagram of the image processing device of this invention.
FIGS. 5A and 5B show specific examples of the two characteristic amounts of this invention.

As shown in FIG. 1, the image processing system 100 of this invention comprises an image signal switching subsystem 100A and a density conversion subsystem 100B. The image signal switching subsystem 100A includes a region evaluation subsystem 101 and a signal selection subsystem 102. The density conversion subsystem 100B comprises a continuous tone image processing subsystem 103 and a binary image processing subsystem 104. As shown in FIG. 1, the image signal for the mixed continuous tone/binary image is input on signal line 107 simultaneously to the region evaluation subsystem 101, the continuous tone image process subsystem 103 and the binary image processing subsystem 104.

The region evaluation subsystem 101 evaluates whether the current portion of the mixed continuous tone/binary input image is a binary region, such as characters, diagrams and other line art, or is a continuous tone region, such as photographs and half-tone dots. The results of the evaluation are output by the region evaluation subsystem 101 to the signal selection subsystem 102. The signal selection subsystem 102 selects which one of the binary signals output by the continuous tone image processing subsystem 103 and the binary image processing system 104 to output on the signal line 106, based on the evaluation results output by the region evaluation subsystem. The signal line 106 is connected to one or more of a storage system, a communication system, a display, or a printer (not shown).

In addition, the region evaluation subsystem 101 further analyzes half-tone regions to determine whether they should be evaluated as a binary region or a continuous tone region. This evaluation is based on the number of half-tone lines in the half-tone region. For example, in a preferred implementation, when the resolution of the mixed continuous tone/binary mixed input image is 300 dots per inch (dpi), a half-tone region having over 100 lines per inch is evaluated as a continuous tone region, while a half-tone region with 100 lines or less per inch is evaluated as a binary region. In addition, if the resolution of the input image is 200 dpi, a half-tone region having over 50 lines per inch is evaluated as a continuous tone region, while a half-tone region having 50 lines or less per inch is evaluated as a binary region.

As described above, the current input image portion input on signal line 107 is simultaneously input to the continuous tone image processing subsystem 103 and the binary image processing subsystem 104 of the density conversion system 100B. The continuous tone image processing subsystem 103 converts the current portion of the mixed continuous tone/binary input image into a binary output image portion to be output on the signal line 106 using a continuous-tone-to-binary conversion method that is appropriate for continuous tone regions (hereinafter "the continuous tone conversion process"). Similarly, the binary image processing subsystem 104 converts the current portion of the mixed continuous tone/binary input image into a binary output image portion to be output on the signal line 106 using a binary-to-binary conversion method that is appropriate for binary regions (hereinafter "the binary conversion process").

It should be appreciated that both the continuous tone image processing subsystem 103 and the binary image processing subsystem 104 convert the current portion of the input image each time. Accordingly, for one of the continuous tone image processing subsystem 103 or the binary image processing subsystem 104, the applied conversion method is inappropriate for the current portion of the input image, while the other conversion method is appropriate for the current portion of the input image. The appropriately converted output image is output on the signal line 106 by appropriate control of the switch 108 by the signal selection subsystem 102. That is, the converted output image signal created by either the continuous tone image processing subsystem 103 or the binary image processing subsystem 104 is selected and output on the signal line 106 by the signal selection subsystem 102 controlling the switch 108.

In the image processing system 100 shown in FIG. 1, the continuous tone image processing subsystem 103 and the binary image processing subsystem 104 operate in parallel. One of the output image signals is selected based on the evaluation results from the region evaluation subsystem 101. It would also be appropriate to perform the region evaluation process first and selectively perform only the appropriate one of the continuous tone processing or the binary processing based on the evaluation results. In this case, the signal selection subsystem 102 would directly control the operation of the continuous tone image processing subsystem 103 and the binary image processing subsystem 104, rather than controlling the switch 108, which would then generally not be needed.

Figure 2:
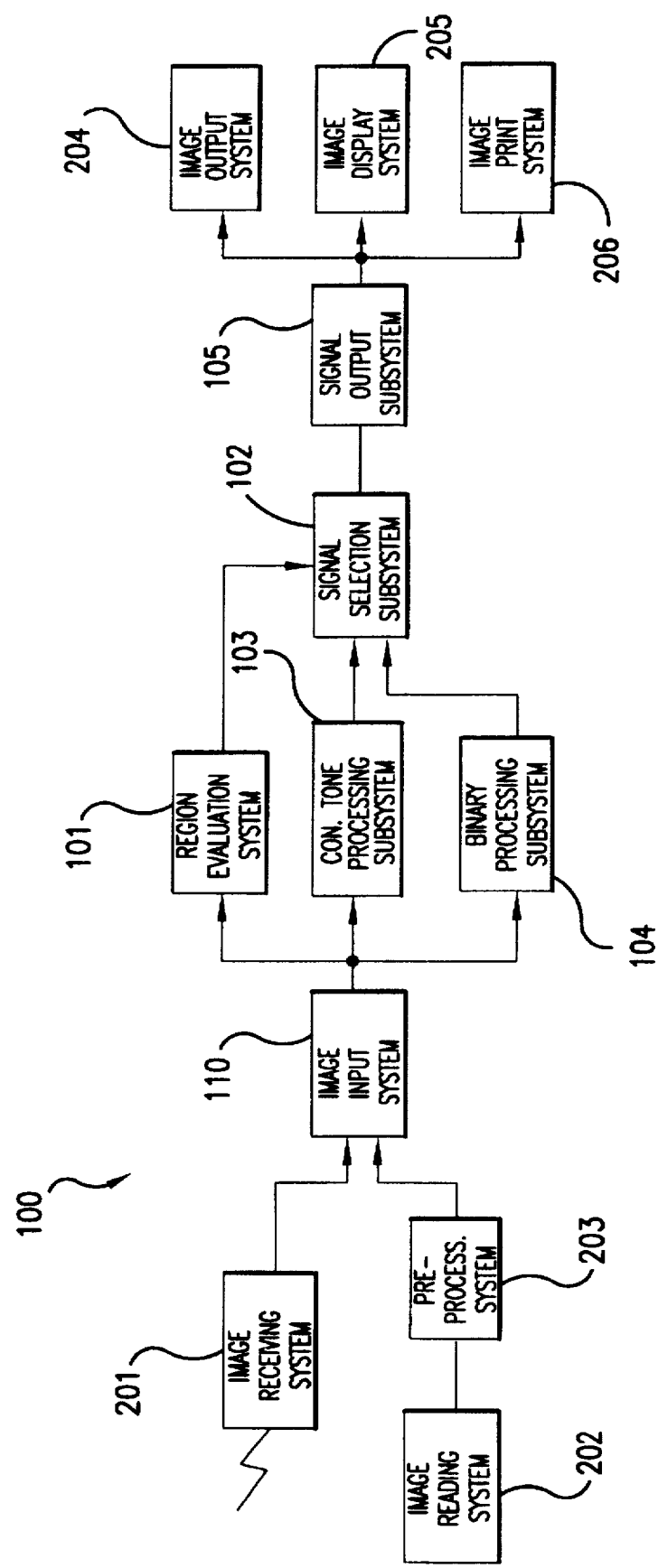
FIG. 2 is an block diagram of an image input/output system incorporating the image processing device of FIG. 1.

As shown in FIG. 2, an image signal having both continuous tone portions (or regions) and binary portions (or regions) is input to an image input system 110, for example, by an image receiving system 201, such as a facsimile, a modem, or a network port, or by an image reading system 202, such as a scanner. The signal read from the image reading system 202 is first converted from analog to digital form. The digital signal output by the image reading system 202 is then input to a preprocessing system 203 that preprocesses the digital signal to perform shading correction on the image signal. The preprocessed image signal is then output by the preprocessing system 203 to the image input system 110. The image input system 110 then distributes the input digital signal to the region evaluation subsystem 101, the continuous tone image processing subsystem 103 and the binary image processing subsystem 104.

The region evaluation subsystem 101 evaluates whether particular regions of the input image are binary regions, such as characters or drawings, or are continuous tone regions, such as photographs or half-tone dots. The signal selection subsystem 102 selects which converted binary signal, either from the binary image processing subsystem 104 or from the continuous tone image processing subsystem 103, to output based on the region evaluation results for each particular region.

The continuous tone image processing subsystem 103 converts each region of the input image into a binary output image using the continuous tone conversion process, which is appropriate for the continuous tone region of the input image. The binary image processing subsystem 104 converts each region of the input image into a binary output image using the binary conversion process, which is appropriate for the binary regions of the input image.

Furthermore, one of the binary images created by the continuous tone image processing subsystem 103 and the binary image processing subsystem 104 is selected by the signal selection subsystem 102 and is output to the signal output means 105. The binary output image signal is output from the signal output means 105 to communication circuits or a memory via an image output means 204, to an image display system 205, such as a CRT, or to an image printing system 206, such as a printer.

In the image processing system 100 shown in FIG. 2, the region evaluation subsystem 101, the continuous tone image processing subsystem 103, and the binary image processing subsystem 104 are positioned so that the continuous tone conversion process and the binary conversion process are performed in parallel, with one of the converted binary output signals being selected and output based on the results of the region evaluation process.

Figure 3:
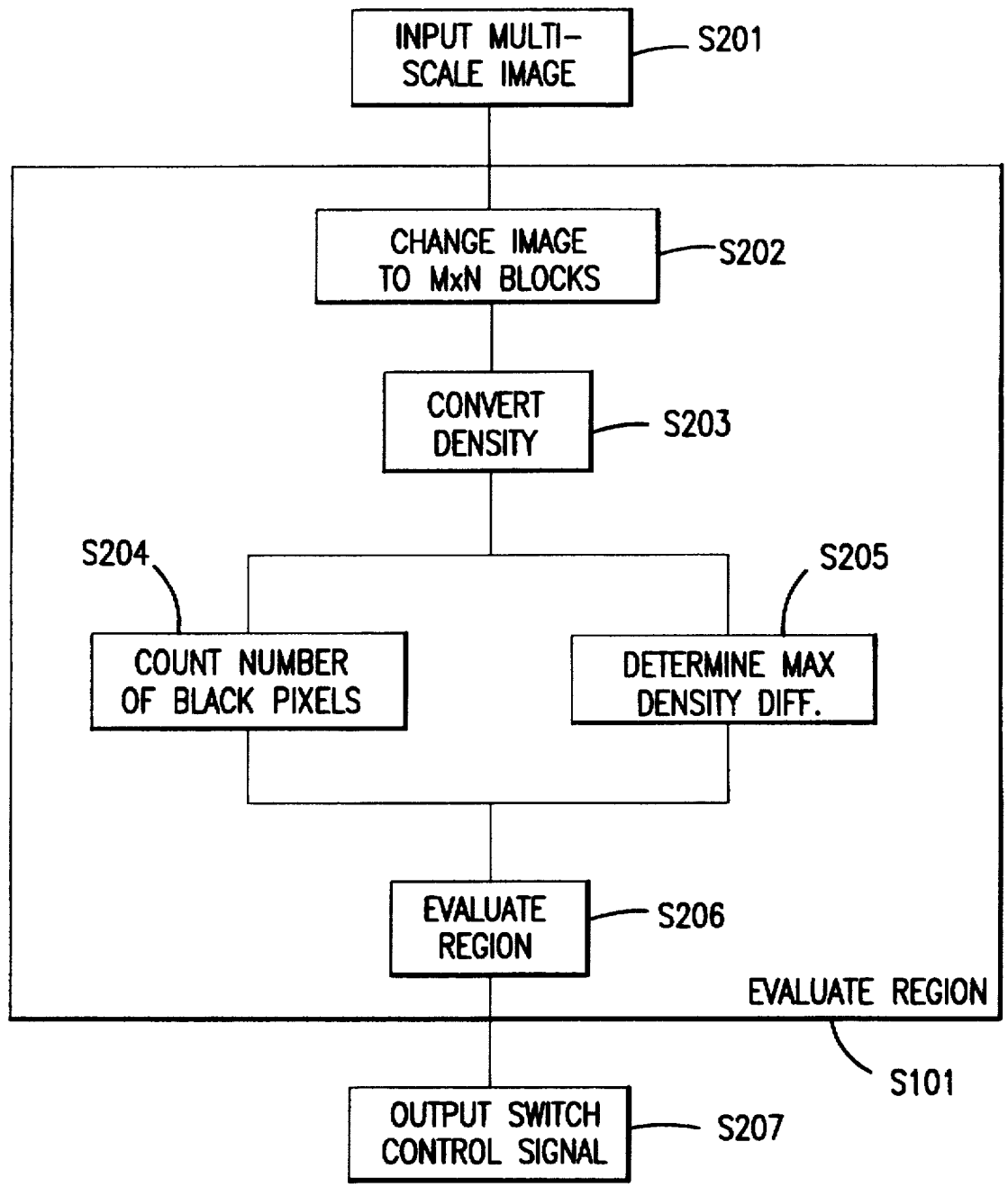
FIG. 3 is a flow chart outlining a first preferred embodiment of the region evaluation step of the image processing method of this invention.

FIG. 3 is a flowchart outlining a first preferred embodiment of the region evaluation process S101. First, in step S201, a mixed continuous tone and binary image, in which the binary and continuous tone regions are intermixed, is input. Next, in step S202, the input image is divided into blocks which are M pixels wide and N pixels high, where M and N are positive integers. Then, in step S203, density conversion of the input image signal is performed on a pixel-by-pixel basis. Next, in step S204, the number of black pixels is counted for each block, while at the same time, in step S205, the maximum density difference is determined for each block. Then, in step S206, for each block, an evaluation is performed to determine whether the block, if the evaluation is done on a block-by-block basis, or the center pixel (target pixel) in each block, if the evaluation is done on a pixel-by-pixel basis, is a binary region or a continuous tone region.

Next, in step S207, a binary signal to be output is selected based on the results of the evaluation step S206 for each block. Thus, when processing each block, when the block is evaluated as a binary region, a switching signal is output to select the binary output signal corresponding to the binary conversion process for all pixels in the block when the evaluation is performed on a block-by-block basis, or for the center pixel when the evaluation is performed on a pixel-by-pixel basis. In contrast, when the block is evaluated as a continuous tone region, a switching signal is output to select the binary output signal corresponding to the continuous tone conversion process for all pixels in the block when the evaluation is performed on a block-by-block basis, or for the center pixel when the evaluation is performed on a pixel-by-pixel basis.

That is, when the evaluation is performed on a pixel-by-pixel basis, a switching signal is output for each pixel to select the binary output signal corresponding to either the binary conversion process or the continuous tone conversion process. Thus, it should be appreciated that the method for dividing the blocks in step S202 differs when the region evaluation of step S206 is performed on a block-by-block basis as when the region evaluation of step S206 is performed on a pixel-by-pixel basis.

Figure 4A:
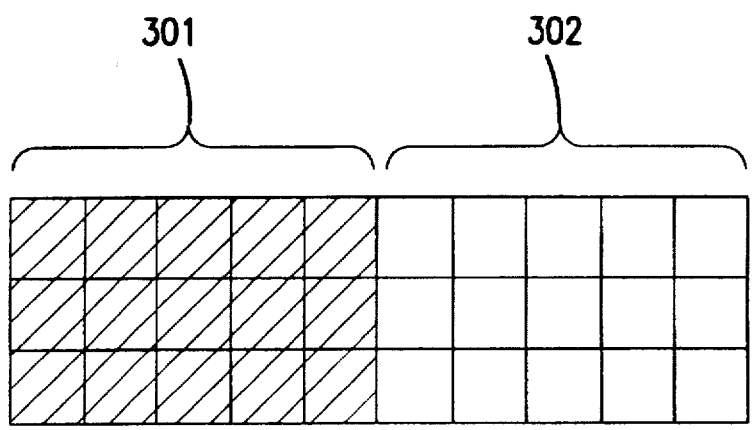
FIGS. 4A and 4B show the block forming methods for block regions and pixel regions of this invention.

FIG. 4A illustrates the block evaluation method when the evaluation is performed on a block-by-block basis. In this case, the input image is divided simply into blocks which are M pixels wide and N pixels high. In FIG. 4A, M=5 and N=3. The block of M×N pixels is referred to as the target block.

The evaluation process is performed on each current block 301, making the block adjacent to it the next target block 302.

Figure 4B:
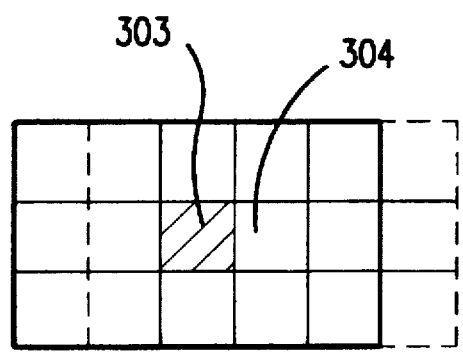

FIG. 4B illustrates the block evaluation method when the evaluation process is performed on a pixel-by-pixel basis. In this case, a block is again M pixels wide and N pixels high. In FIG. 4B, as in FIG. 4A, M=5 and N=3. The block is centered around a target pixel 303. When the next pixel 304 is processed, a new block (not shown), which is also M pixels wide and N pixels high, is formed and centered around the next pixel 304.

As described above, the input image signal has 256 possible density levels or gradations. Naturally, it is possible to process the signal in the 256 level form. However, because only 16 density levels are sufficient for the region evaluation process of this invention to operate correctly and efficiently, the number of density levels in the image signal is preferably reduced from 256 to 16. In one preferred embodiment of this reduction process, the value of the density level for each pixel is divided by 16, and rounded to the nearest integer value. Thus, by conducting the density conversion of step S203, the size of the hardware can be reduced. It should also be appreciated that either step S202 or step S203 can be performed first.

Preferably, in this invention, the value of N ranges from 1-5 and the value of M ranges from 4-20. The value of N is limited only so that the hardware requirements for the image memory can be reduced. Thus N can be any value supportable by the hardware. The value of M is limited only so that instances where both binary and continuous tone regions occur within a single block are avoided or minimized. Furthermore, the total number of pixels in a block (i.e., the value for (M·N) is preferably 8-40, in order to reduce the amount of calculation and to reduce the size of the hardware. During experiments, block dimensions of 16×1, 8×2, 10×2 and 8×3 pixels yielded the best results.

In step S204, the number of black pixels is the total number of pixels in the block having a reduced image density at most equal to the threshold value T1. In the first preferred embodiment, T1 is set to 11. The inventors have determined during experiments that, in general, the threshold value T1 should be set at around ¾ of the total number of input density levels, in order to accurately count the number of black pixels without the black pixel count being affected by the background color of the paper used in reproduction. Accordingly, in this first preferred embodiment, because the number of density levels is set at 16 through the density conversion step S203, the threshold value is set at 11, which generally corresponds to ¾ of 16.

In step S205, the maximum density difference is the difference between the maximum density and the minimum density among the pixels of each block. FIGS. 5A and 5B show examples of possible density distributions in a block. In FIGS. 5A and 5B, the block is 6 pixels wide and 3 pixels high. FIG. 5A shows an example of a binary region, while FIG. 5B shows an example of a continuous tone region. In FIG. 5A, the pixels having a density of 0 form a portion of a binary image, such as a line or character. The pixels having a density of 15 are blank (i.e., white). In general, the maximum density difference is large in the binary region because the contrast between white and black pixels is distinct. The number of black pixels is small because of the large number of blank pixels in a binary image. In FIG. 5A, the maximum density difference is 15 and the number of black pixels, that is, the pixels having a density at most equal the threshold value T1 of 11, is 9.

In contrast, in FIG. 5B, all of the pixels have a density level of either 7 or 8, as these pixels form a portion of a continuous tone region, such as a photograph. In general, the maximum density difference is small in the continuous tone region because density changes are gradual. The number of black pixels is great because there are few pixels that are white in a continuous tone image. In FIG. 5B, the number of black pixels, that is, the pixels having a density at most equal to the threshold value T1 of 11, is 18, and the maximum density difference is 1.

In the examples shown in FIGS. 5A and 5B, if the average density is determined, the same value would result for both FIG. 5A and FIG. 5B, making impossible any distinction between the binary and continuous tone regions. However, in this invention, by using the number of black pixels, the resulting value differs greatly between the two regions, making it possible to distinguish easily between the binary regions and the continuous tone regions of the mixed input image.

It should be appreciated that it would also be appropriate to determine the number of white pixels instead of the number of black pixels. The number of white pixels is the total number of pixels in a block having an image density greater than the threshold value T1. To find the number of black pixels from the number of white pixels, the number of white pixels is subtracted from the total number of pixels M·N in the block. When this process is performed by hardware, the processes can be performed in parallel, as shown in FIGS. 1 and 2. However, when this process is performed by software, the processes must be performed serially, with either the maximum density difference determining step S205 or the black pixel counting step S204 being performed first.

As described above, after the two characteristic amounts, i.e. the number of black pixels and the maximum density difference, have been extracted, the evaluation of step S206 to determine whether the target block is a binary region or a continuous tone region is performed.

Figure 6A:
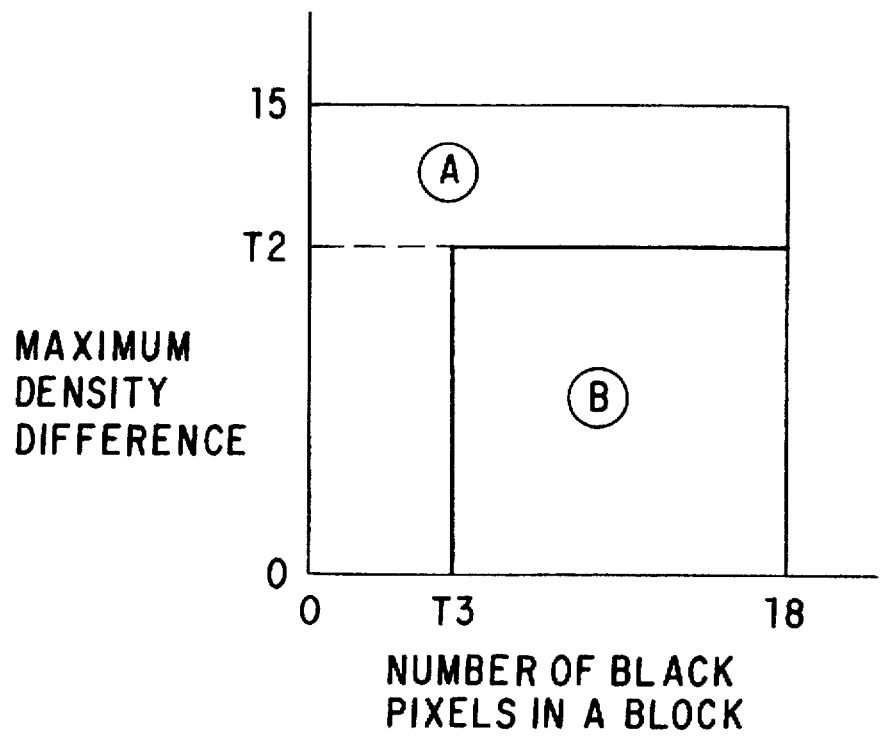
FIGS. 6A and 6B graphically show the region evaluation states of this invention.

FIG. 6A illustrates one example of the evaluation conditions used to evaluate whether a block, or a pixel, is a binary region or a continuous tone region. FIG. 6A shows the region evaluation conditions when the block size is 16 pixels by 1 pixel, and the density has 16 gradations 0–15. In this case, when both the maximum density difference of a block is at most equal to a threshold value T2 and the number of black pixels is at least equal to a threshold value T3, the current block falls into area B of FIG. 6A. Otherwise, if either the maximum density is above the threshold value T2 or the number of black pixels is below the threshold value T3, then the current block falls into area A of FIG. 6A. When the block falls into area B, then the block, if the evaluation is on a block-by-block basis, or the center pixel, if the evaluation is on a pixel-by-pixel basis, is evaluated as a continuous tone region or pixel. In contrast, when the block falls into area A, then the block, or pixel is evaluated as a binary region or pixel. For this example, the results of experiments indicate that optimum results can be obtained by setting T2=10 and T3=4.

Figure 6B:
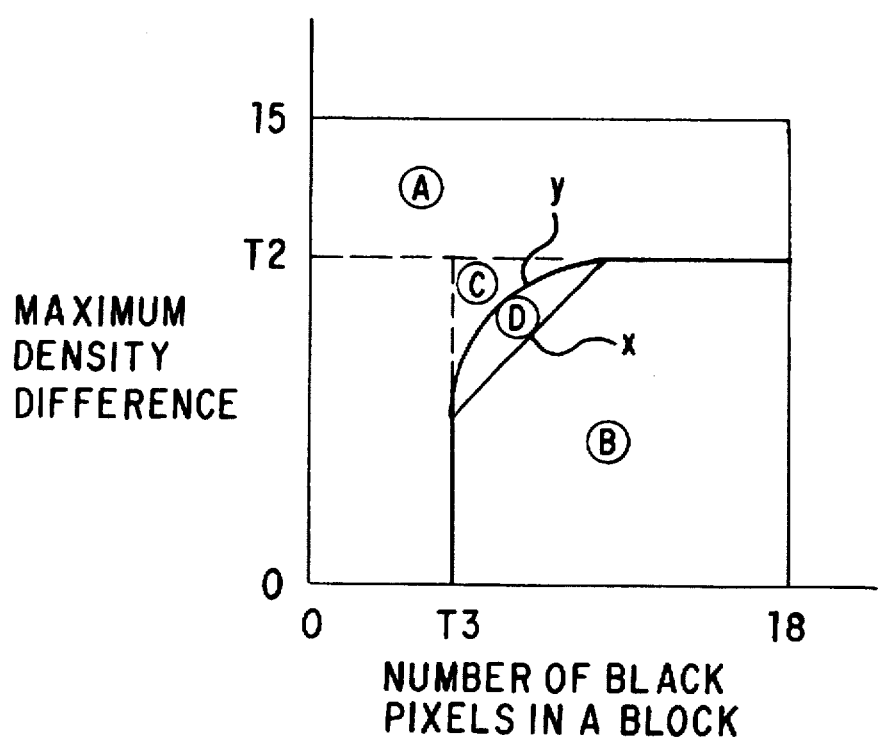

Another example of the region evaluation conditions is illustrated in FIG. 6B. In this example, the conditions are not determined by two straight lines, one vertical and one horizontal, as in the example shown in FIG. 6A. Rather, the precision of the evaluation process is enhanced by using an inclined line x or a curved line y in place of the perpendicular intersection of the horizontal and vertical lines of FIG. 6A. Thus, those blocks whose maximum difference values and black pixel values would place them in areas C and D, if the inclined line x is used, or area C, if the curved line y is used, will be evaluated in FIG. 6B as binary regions instead of continuous tone regions. In this invention, the threshold values T2 and T3 and the shape of the curve y used in the evaluation process are optimized based on the block size used.

When the number of white pixels is used as a characteristic amount, while it may be appropriate to calculate the number of black pixels, but the same results can be obtained by replacing the 0 on the horizontal axis (number of black pixels) in FIGS. 6A and 6B with 16, and by replacing the 16 with 0.

In this way, because the two characteristic amounts (i.e., the number of black pixels and the maximum density difference) are used in the region evaluation step S206, the precision of the region evaluation process S101 is enhanced compared to region evaluation methods which use only a single characteristic amount. In addition, because each of the characteristic amounts can be obtained through a simple process, only a short processing time is needed and the hardware implementation can be accomplished without difficulty.

Figure 7:
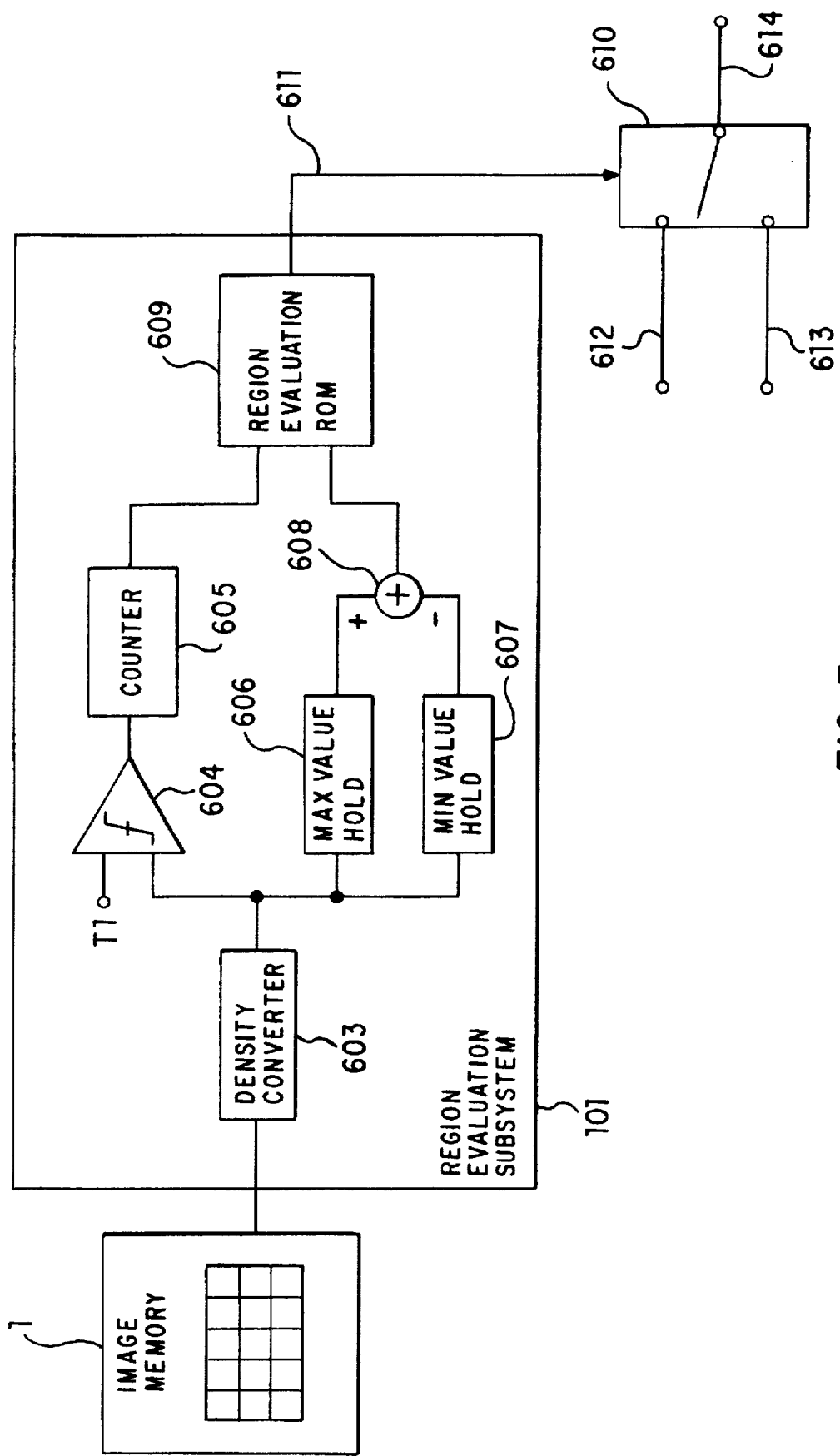
FIG. 7 is a block diagram of a first preferred embodiment of the region evaluation subsystem.

The first preferred embodiments of the specific hardware structures of the major subsystems of the image processing device shown in FIGS. 1 and 2 will be described with reference to FIGS. 7 to 11. FIG. 7 shows the structure of the region evaluation means 101 and the signal selection means 102 shown in FIG. 2. As shown in FIG. 7, image data stored in an image memory 1 is scanned to locate each block of M×N pixels. The scanned image data is then output on a block-by-block basis to a density converter 603, where the density is converted from 256 density levels to 16 density levels.

The density converter 603 outputs the block of density-converted image data on a pixel-by-pixel basis to a comparator 604. The comparator 604 compares the density level of each pixel of the block to the threshold value T1. Based on the results of the comparison, the comparator 604 outputs signals to a counter 605, which counts 1 each time a black pixel is detected. Thus, the total number of black pixels in the block is stored by the counter 605.

The pixel data output from the density converter 603 is also input to a maximum value detector 606 and a minimum value detector 607. For each block, as each converted pixel is output from the density converter 603, the maximum value detector 606 determines if the current pixel has a higher density value than the current maximum density value stored in the maximum value detector 606, and stores the density value of the current pixel if it is higher. Similarly, the minimum value detector determines if the density value of the current pixel is lower than the current minimum density value stored in the minimum value detector 607, and stores the density value of the current pixel if it is lower. The density difference is determined as the difference between the density values stored in the maximum and minimum value detectors 606 and 607. That is, after the current block is completely output by the density converter 603, the minimum and maximum value detectors output a minimum value and a maximum value for the current block to a differentiator 608. When all pixel data in the current block has been scanned, the maximum density difference for the current block is output by the differentiator 608.

In the example shown in FIG. 6A, the value for the number of black pixels ranges from 0 to M·N, which is 18 for the blocks shown in FIGS. 5A and 5B, and the maximum density difference ranges from 0 to 15. The number of black pixels counted by the counter 605 and the maximum difference value output by the differentiator 608 are input to a region evaluation ROM 609. The region evaluation ROM 609 uses the 5-bit number-of-black-pixels value output by the counter 605 and the 4-bit maximum-density-difference value output by the differentiator 608 to form the 9-bit input address.

In the region evaluation ROM 609, region evaluation results which use the two characteristic amounts as the input addresses are stored as indicated in either FIG. 6A or FIG. 6B. Since the region evaluation results are stored in the region evaluation ROM 609, rather than being calculated in real-time, very complex curves y can be used to divide area A from area B without increasing the complexity of the system. From the values for the number of black pixels and the maximum density difference, an evaluation signal is output from the region evaluation ROM 609 indicating whether this block, or the center pixel, is a binary region or a continuous tone region. Based on the evaluation signal, a binary output signal, corresponding to the block, or the center pixel, and output from either the continuous tone image processing subsystem 103 on the signal line 612 or the binary image processing subsystem 102 on the signal line 613, is selected by the binary switching unit 610 to be output on the signal line 614 to a printer, a display or the like. In FIG. 7, the switching unit 610 corresponds to the signal selection subsystem 102.

Figure 8:
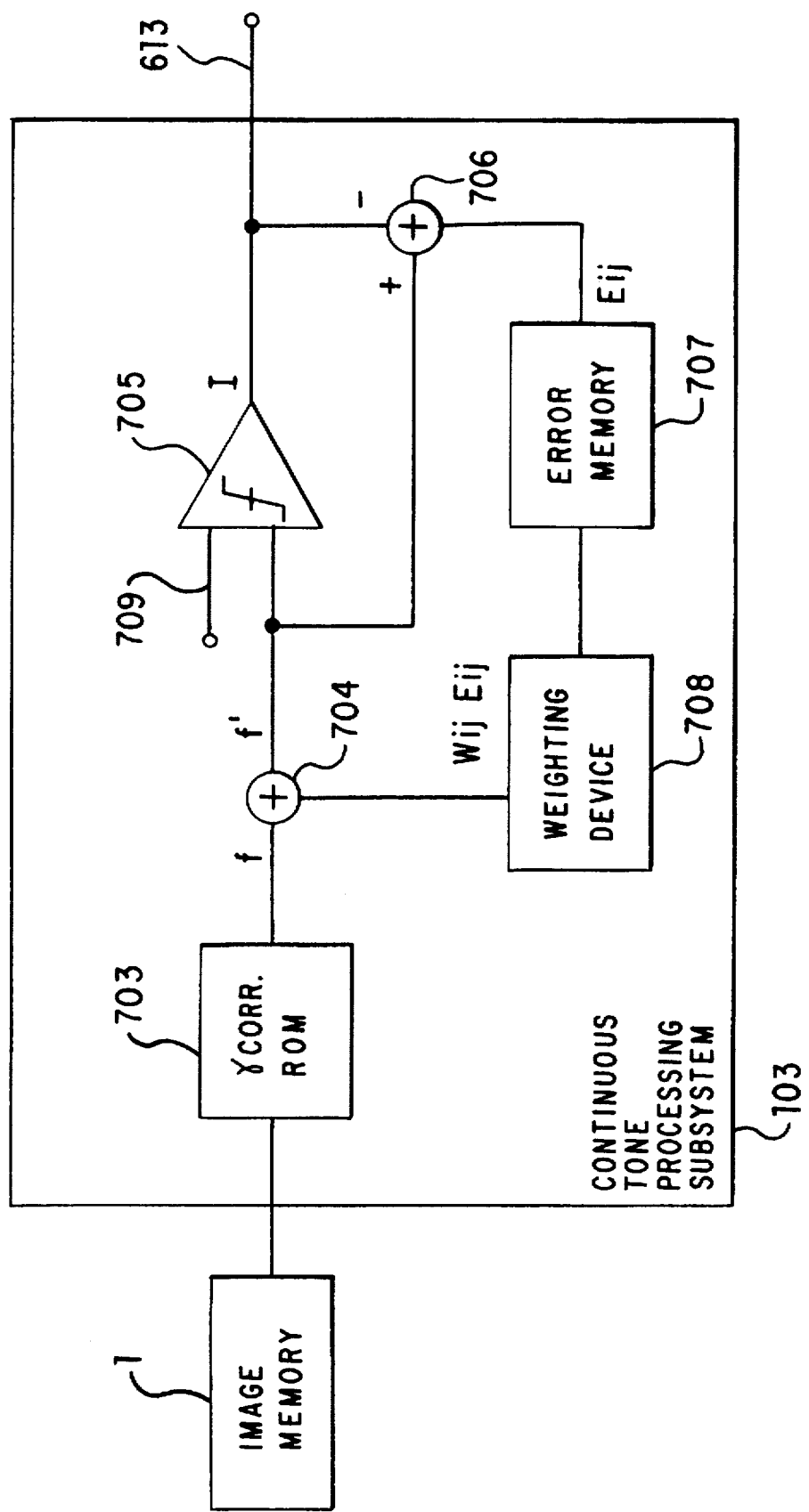
FIG. 8 is a block diagram of a first preferred embodiment of the continuous tone processing subsystem of FIG. 1.
Figure 10:
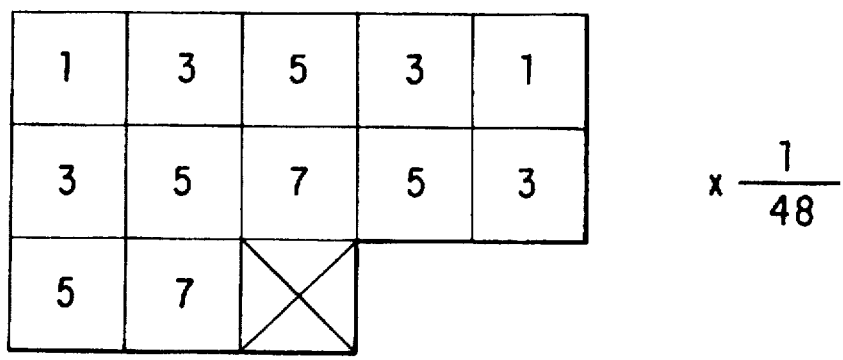
FIG. 10 shows an example of a weighing matrix used in the continuous tone processing subsystem of FIG. 8.

A first preferred embodiment of the continuous tone image processing subsystem 103 shown in FIG. 2 is shown in greater detail in FIG. 8. In FIG. 8, the image memory 1 outputs the current block being evaluated by the region evaluation subsystem 101 to the continuous tone image processing subsystem 103. The current block is input to a gamma correction ROM 703 which stores a gamma correction table and which alters the density values for the pixels of the current block. The gamma-corrected block is output from the gamma correction ROM 703 on a pixel-by-pixel basis and undergoes the continuous tone conversion process using the so-called error diffusion method. That is, as each pixel of the current block is output to the differentiator 704, the density value f for a current pixel is corrected by adding to it the weighted error $W_{ij}E_{ij}$ to form f'. That is, $f'=f+W_{ij}E_{ij}$. Next, the corrected density value f' for the current pixel is compared by a comparator 705 to a binary threshold value input on signal line 709. The comparator 705 outputs, based on the comparison, a binary valued signal I. That is, based on the comparison, I is 0 or 1. The differentiator 706 determines the error $E_{ij}$, where $E_{ij}=I-f'$, and stores it in the error memory 707. The weighing device 708 performs a weighing process on the error stored in the error memory 707 using a weighted matrix $W_{ij}$. FIG. 10 shows one preferred example of the weighted matrix $W_{ij}$. Then, the weighted error $W_{ij}E_{ij}$ is fed back to the differentiator 704 to be added to the gamma corrected density value of a next pixel.

The gamma correction provided by the gamma correction ROM 703 corrects the pixel density based on the attributes of the output device (i.e., the printer, the display or the like). That is, when gamma correction is not provided, the density information is not correctly evaluated for the output device for the continuous tone images.

Figure 9:
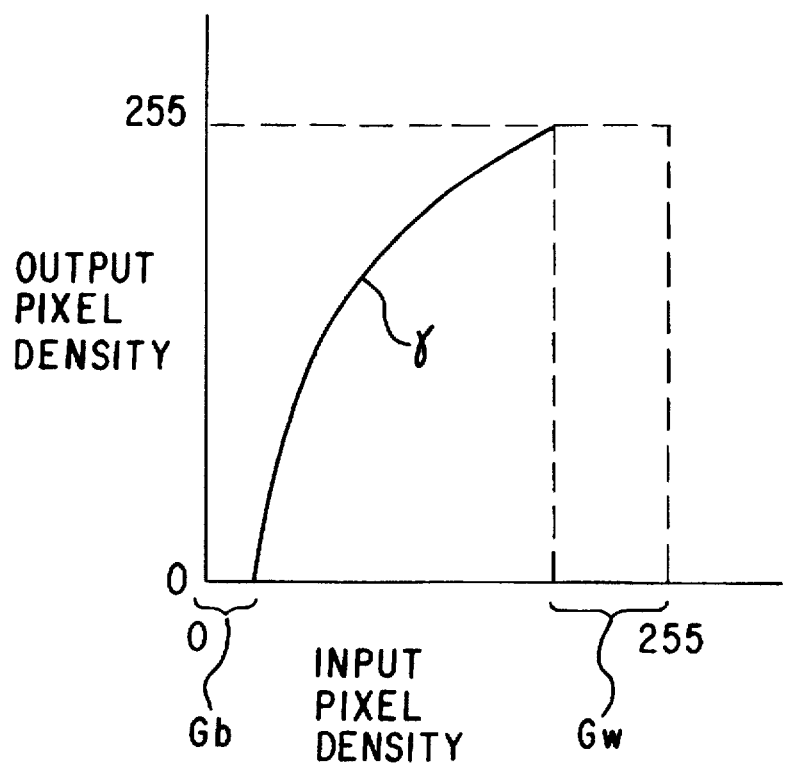
FIG. 9 graphically shows an example of a gamma-correction curve used in the continuous tone processing subsystem of FIG. 8.

FIG. 9 shows one example of the gamma correction curve (for laser printers) used in the image processing system 100 of this invention. In FIG. 9, the horizontal axis is the input image density level, while the vertical axis is the corresponding gamma-corrected image density level. The gamma curve used in the present invention has a non-sensitive zone Gb of about 32 density levels on the black level side and a non-sensitive zone Gw of about 64 density levels on the white level side. This gamma correction scheme is used to keep errors from standing out in the processed image when binary regions are erroneously evaluated as continuous tone regions by the region evaluation subsystem 101. When a gamma correction curve such as the one shown in FIG. 9 is used, the contrast between white and black is distinct and good image quality is obtained, even if part of a character erroneously undergoes the continuous tone conversion process to generate the binary output. Naturally, when the gamma curve shown in FIG. 9 is used, the quality of the gray scale in the continuous tone regions deteriorates somewhat, but this is not a problem, because, in most every actual continuous tone image, there are essentially no image areas that are either completely black or completely white.

FIG. 8 shows a continuous tone image processing subsystem 103 which uses the error diffusion method. However, it is also possible for the continuous tone image processing subsystem 103 to use a dither method which converts the continuous tone regions to the binary output using a threshold value which periodically changes.

Figure 11:
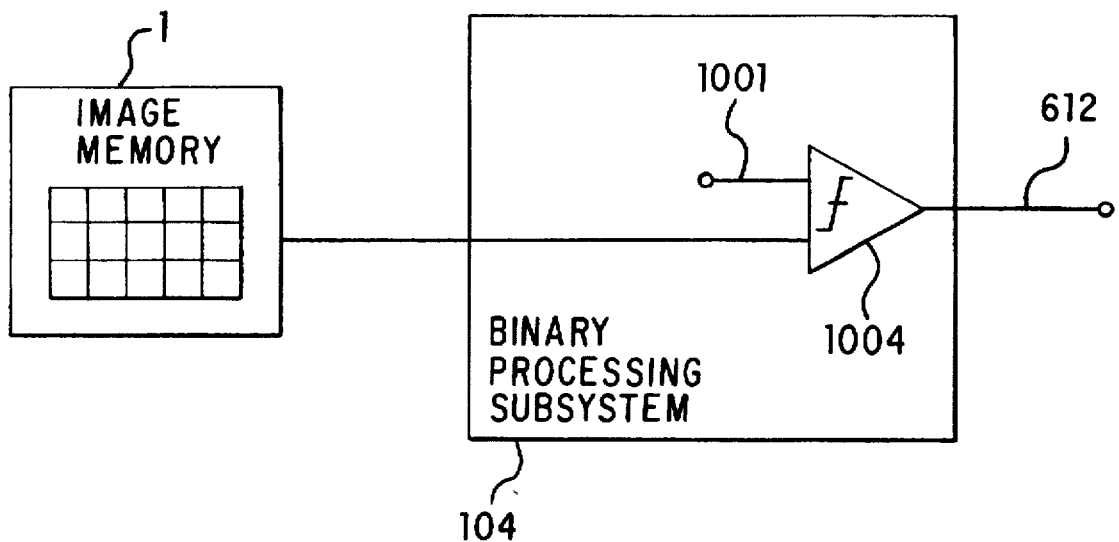
FIG. 11 is a block diagram of a first preferred embodiment of the binary processing subsystem of FIG. 1.

FIG. 11 shows a first preferred embodiment of the binary image processing subsystem 104 shown in FIG. 2. As shown in FIG. 11, the image memory 1 outputs the current block being evaluated by the region evaluation subsystem 101 to the binary image processing subsystem 104. The block output by the image memory 1 is input on a pixel-by-pixel basis to a comparator 1004. The comparator 1004 compares a density level of each pixel to a binary threshold value input on signal line 1001. Based on the comparison, the comparator 1004 outputs a binary output signal. That is, based on the comparison, the binary output signal is either 0 or 1.

In the present example, the threshold value input on signal line 1001 is held constant. In particular, the threshold value is set to 128 when there are 256 density levels and white is density level 255. However, the binary output signal can be created using various well-known methods, such as using the average density of the current block as the binary threshold value input on signal line 1001.

Figure 12:
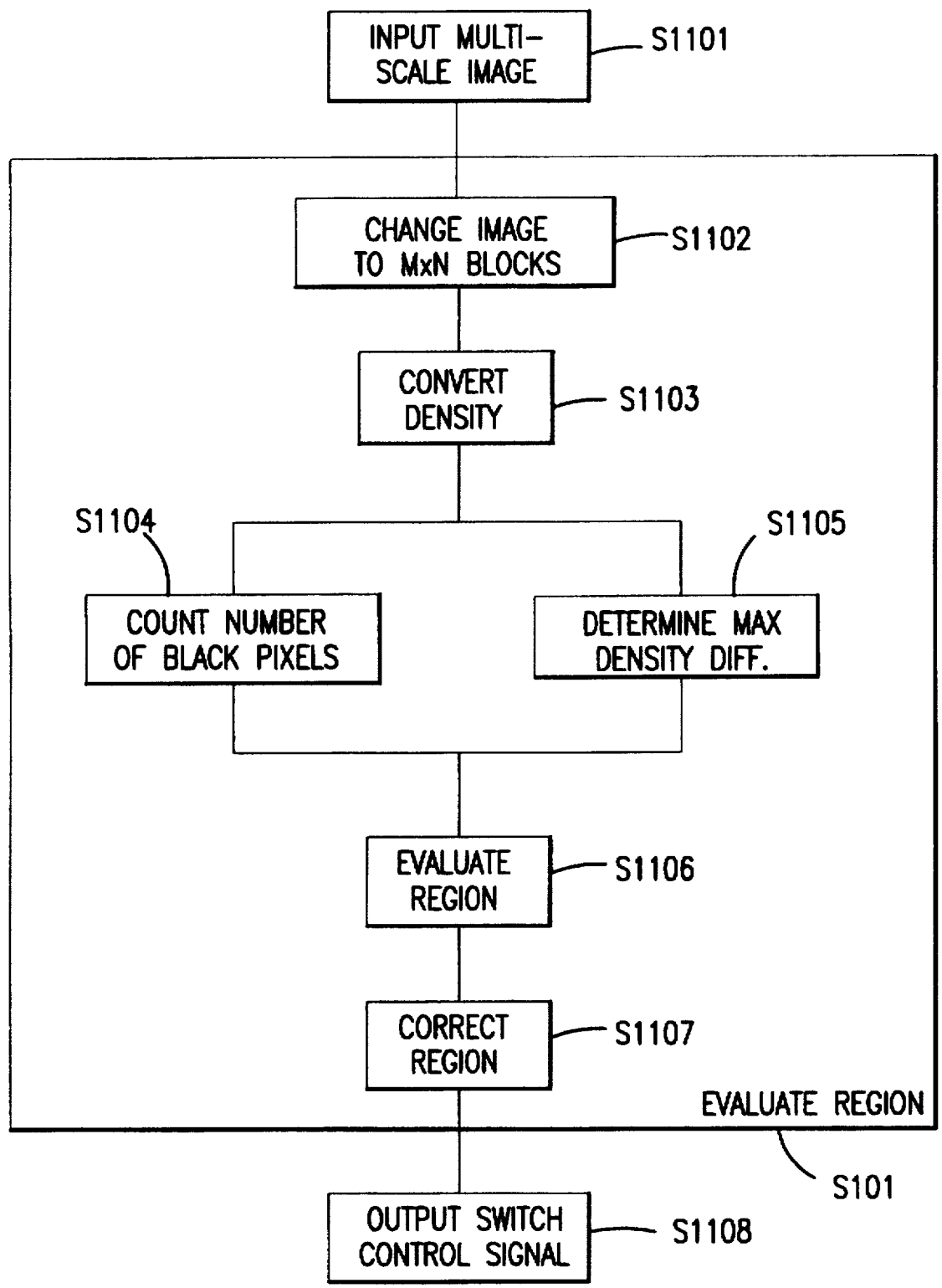
FIG. 12 is a flow chart outlining a second preferred embodiment of the region evaluation step.

FIG. 12 shows a flowchart outlining a second preferred embodiment of the region evaluation process. First, after the multi-scale image, in which binary and continuous tone regions are intermixed, is input in step S1101, in step S1102, the image is divided into blocks which are M pixels wide and N pixels high. Next, in step S1103, the input multiple-density-level image is density converted. Then, for each block, in step S1104, the number of black pixels is counted, while in step S1105, the maximum density difference is determined. After the two characteristic amounts, which are the number of black pixels and the maximum density difference, have been extracted for each block, step S1106 is executed. In step S1106, when processing the image on a block-by-block basis, an evaluation is made to determine whether each block is a binary region or is a continuous tone region. In step S1106, when processing the image on a pixel-by-pixel basis, an evaluation is made to determine whether the center pixel in each block is a binary region or is a continuous tone region. Thus, steps S1101 to S1106 of this second preferred embodiment are the same as steps S201 to S206 of the first preferred embodiment, so a further detailed description of these steps is omitted.

Following the region evaluation step S1106, step S1107 is executed. In step S1107, region correction is performed based on the attributes of the target block or the target pixel and the evaluation results of step S1106 for the surrounding blocks or pixels. In this second preferred embodiment, the attribute for the target block or pixel is the binary or continuous tone region assigned to the block or pixel resulting from the region evaluation on each block or each pixel of step S1106.

Figure 13:
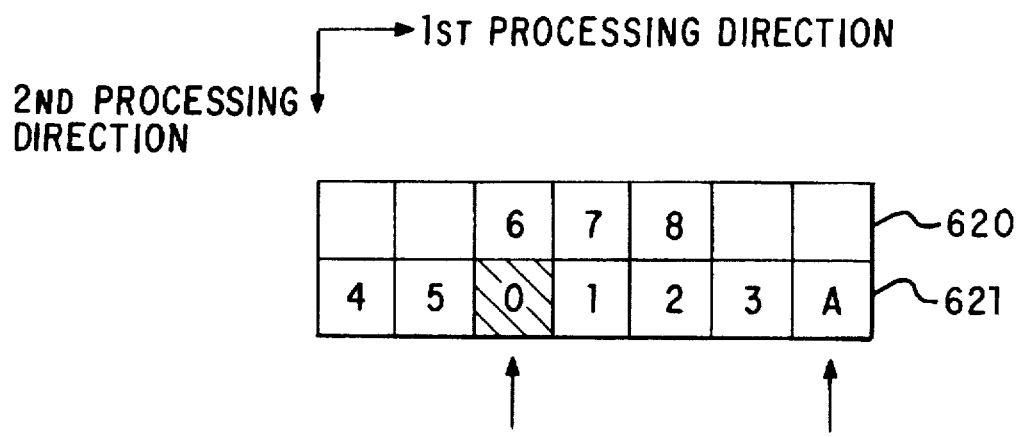
FIG. 13 shows a first preferred embodiment of the reference blocks or reference pixels for the region correction step of FIG. 12.
Figure 14:
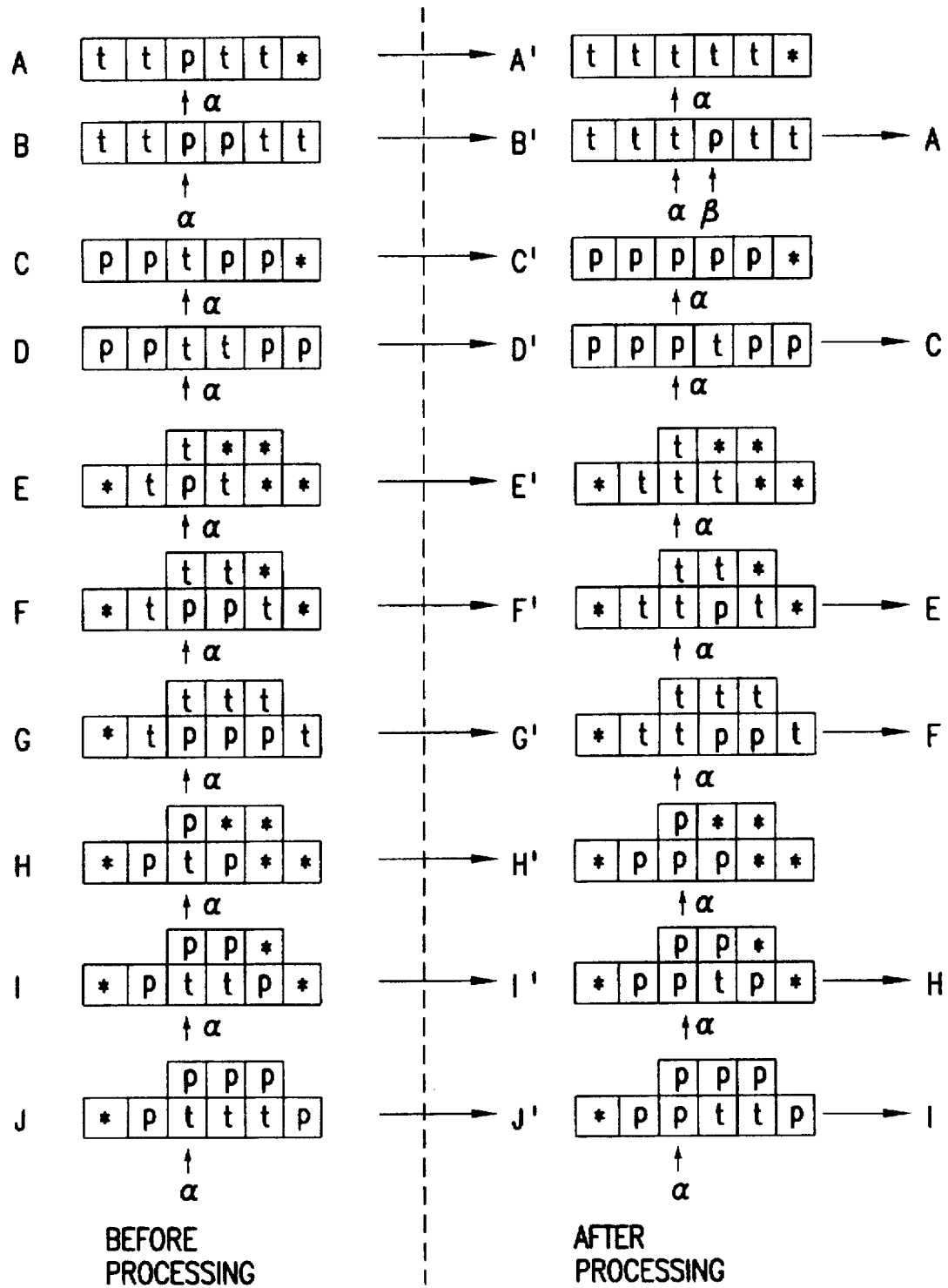
FIG. 14 shows examples of the patterns used in the pattern matching procedure of the region correction step of FIG. 12.

The region correction process of step S1107 is illustrated in FIGS. 13 and 14. In FIG. 13, the squares labelled 0–8 and A represent blocks or pixels. That is, when the region evaluation process of FIG. 12 is performed on a block-by-block basis, the squares represent blocks, and when the process is performed on a pixel-by-pixel basis, the squares represent pixels. Thus, the basic steps in the process are the same, regardless of whether the process is accomplished for each block or for each pixel. The following description assumes, for ease of illustration, that the process is performed on a block-by-block basis. In FIG. 13, the block labelled 0 is the target block, which is the object of the correction process. Thus, blocks 1–8 are reference blocks.

FIG. 14 shows one preferred example of the attribute patterns used in the correction process of step S1107. In FIG. 14, the block indicated by the arrow labeled a is the target block, t indicates that the block attribute indicates a binary region, p indicates that the block attribute indicates a continuous tone region, and * indicates a don't care condition, in that the block can be either a binary region or a continuous tone region.

The block attributes matching the patterns shown in examples A–D of FIG. 14 are corrected to the patterns indicated by examples A'–D', using only the reference blocks present in the row of blocks that is currently being processed (i.e. reference blocks 1–5 of FIG. 13). For example, assume a region evaluation result matches the pattern shown in example A. In this case, only the target block has been evaluated as a continuous tone region p, despite the fact that all of the surrounding reference blocks of the current row have been evaluated as binary regions t. Therefore, this continuous tone evaluation for the target block is considered to be an error, and the evaluation is corrected to indicate this block is a binary region t, as shown in example A'. The correction patterns A–D correct errors in at most two blocks.

In addition, when using the reference blocks provided in the row of blocks currently being processed (reference blocks 1–5) and the row of blocks already processed (blocks 6–8), the block attributes matching the patterns shown in examples E–J are corrected to the patterns indicated by examples E'–J'. In the corrected patterns of examples E'–J', it is possible to correct consecutive errors in no more than 3 blocks.

In this example, attribute correction is accomplished only on the target block (the block indicated by the arrow labeled α. However, when blocks matching the pattern in example B, for example, are corrected so that one of the two blocks evaluated as continuous tone region p is not corrected to be a binary region t, as in example B (as indicated by the arrow labeled β in example B), when the target block is shifted one block to the right in the next correction pass, this block will be corrected because the pattern row now matches example A. Therefore, it is not necessary to correct this block in the first pass. The corrected patterns are set so as to statistically locate all errors in patterns when the region evaluation process is accomplished on various images.

After the region correction step S1107 has been completed, step S1108 is executed. In step S1108, a switching signal is output to select the binary output signal corresponding to the attribute of the block. In other words, when the block is evaluated to be a binary region, a binary signal converted by the binary conversion process is selected and output, and when the block is evaluated as being a continuous tone region, a binary signal converted by the continuous tone conversion process is selected and output.

In general, when a document image is processed, the process is performed on the document from left to right in the first processing direction shown in FIG. 13, and is thus accomplished on each line or row of blocks, and after processing each line or row of blocks, the system moves to the next line or row of blocks in the 2nd processing direction. Accordingly, when region correction is performed on the reference blocks shown in FIG. 13, it is necessary that the characteristic amount extraction and region evaluation processing on at least block 3 of FIG. 13 has been completed. When these processes are performed in parallel, the characteristic amount extraction and the region evaluation processes are performed on block A, while the region correction process is performed on block 0.

Thus, by correcting the region evaluation of a block or pixel based on the attributes of the surrounding blocks or pixels, it is possible to boost the precision of the region evaluation process.

Figure 15:
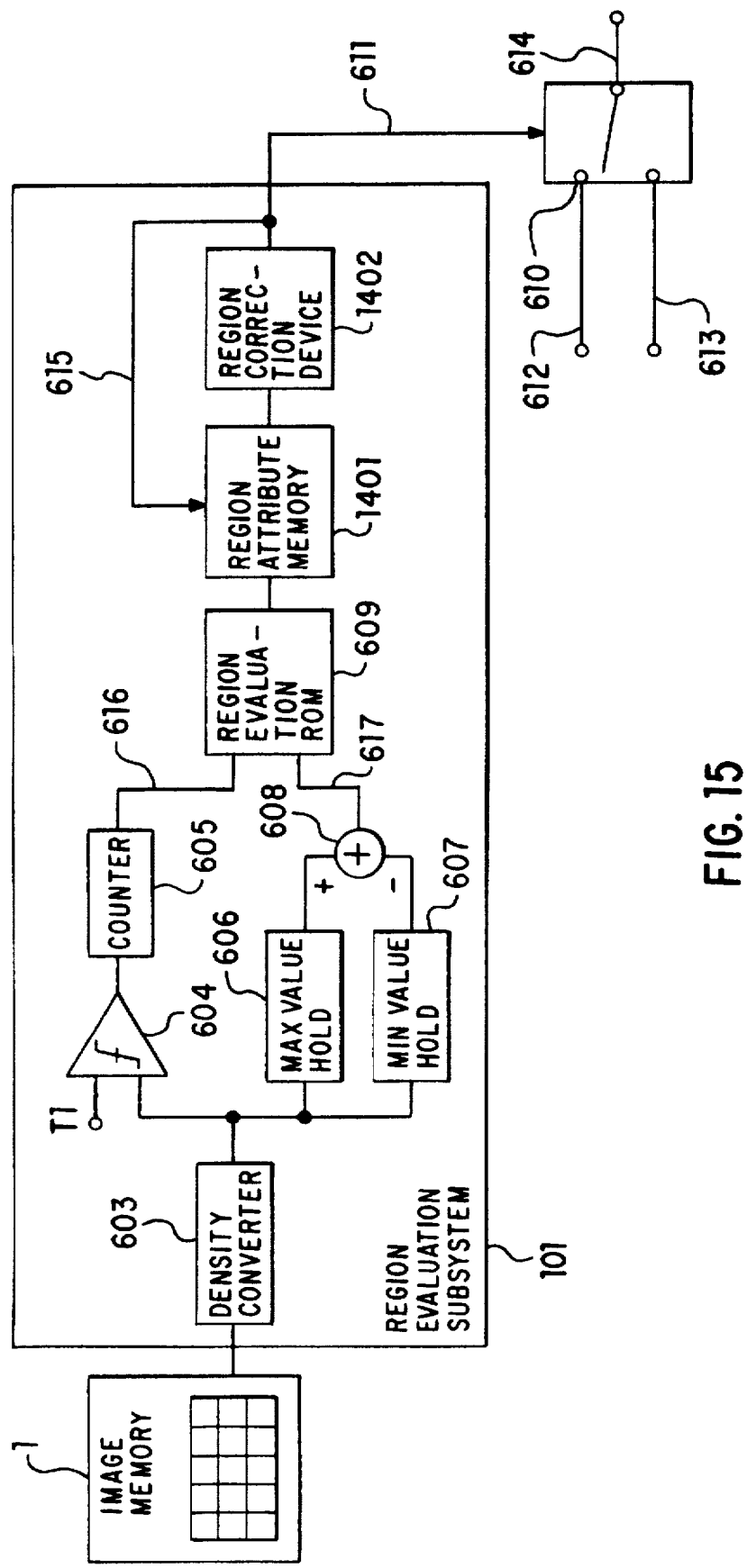
FIG. 15 is a block diagram of a second preferred embodiment of the region evaluation subsystem.

FIG. 15 shows second preferred embodiment of the region evaluation subsystem 101 of FIGS. 1 and 2. In FIG. 15, the image memory 1 through the region evaluation ROM 609 are the same as in the first preferred embodiment shown in FIG. 7. Thus, any further description of these elements is omitted. The description which follows will focus on the region attribute memory 1401 and the region correction device 1402 of this second preferred embodiment.

The region attribute memory 1401 stores the attributes of the blocks or pixels necessary for the region correction process, the memory storing the attributes of the row 621 of blocks which are currently being processed and the attributes of the row 620 of blocks which have already been processed, as shown in FIG. 13. Naturally, when the row 620 of blocks which have already been processed is not referred to, it is appropriate to store just the attributes of the necessary number of blocks or pixels in the row 621 of blocks currently being processed. The region correction device 1402 outputs the corrected attribute of the target block or target pixel 0 based on the attributes of blocks or pixels 0–8, when the reference blocks or reference pixels shown in FIG. 13 are 1–8. The attribute of a binary region is 1 and the attribute of a continuous tone region is 0. Thus, the target and reference blocks 0–8 provide 9 bits, for 512 possible input states. For each of the 512 input states, either a binary region attribute 1 or a continuous tone region attribute 0 is output. The patterns A–J shown in FIG. 14 are included in these 512 possible states, and when the pattern matches one of these patterns A–J, the attribute of the target block or pixel is corrected.

The output of the region correction device 1402 is input to the binary signal switching unit 610 and a binary signal, corresponding to the corrected evaluated attribute for the current block or pixel, is output. In other words, when processing is performed on each block, a binary output signal converted by a binary conversion process is selected when the block is a binary region, and a binary output signal converted by a continuous tone conversion process is selected when the block is a continuous tone region.

The output of the region correction device 1402 is also fed back to the region attribute memory 1401 to overwrite the attribute of the target block or target pixel 0. When the input pattern does not match one of the patterns A–J shown in FIG. 14, the attributes prior to and after overwriting are the same. However, in order to keep the structure of the hardware simple, overwriting is always accomplished regardless of whether or not the attribute has been corrected. Accordingly, in FIG. 13, the region correction process is based on already corrected blocks 4–8, and uncorrected blocks 1–3.

Figure 16:
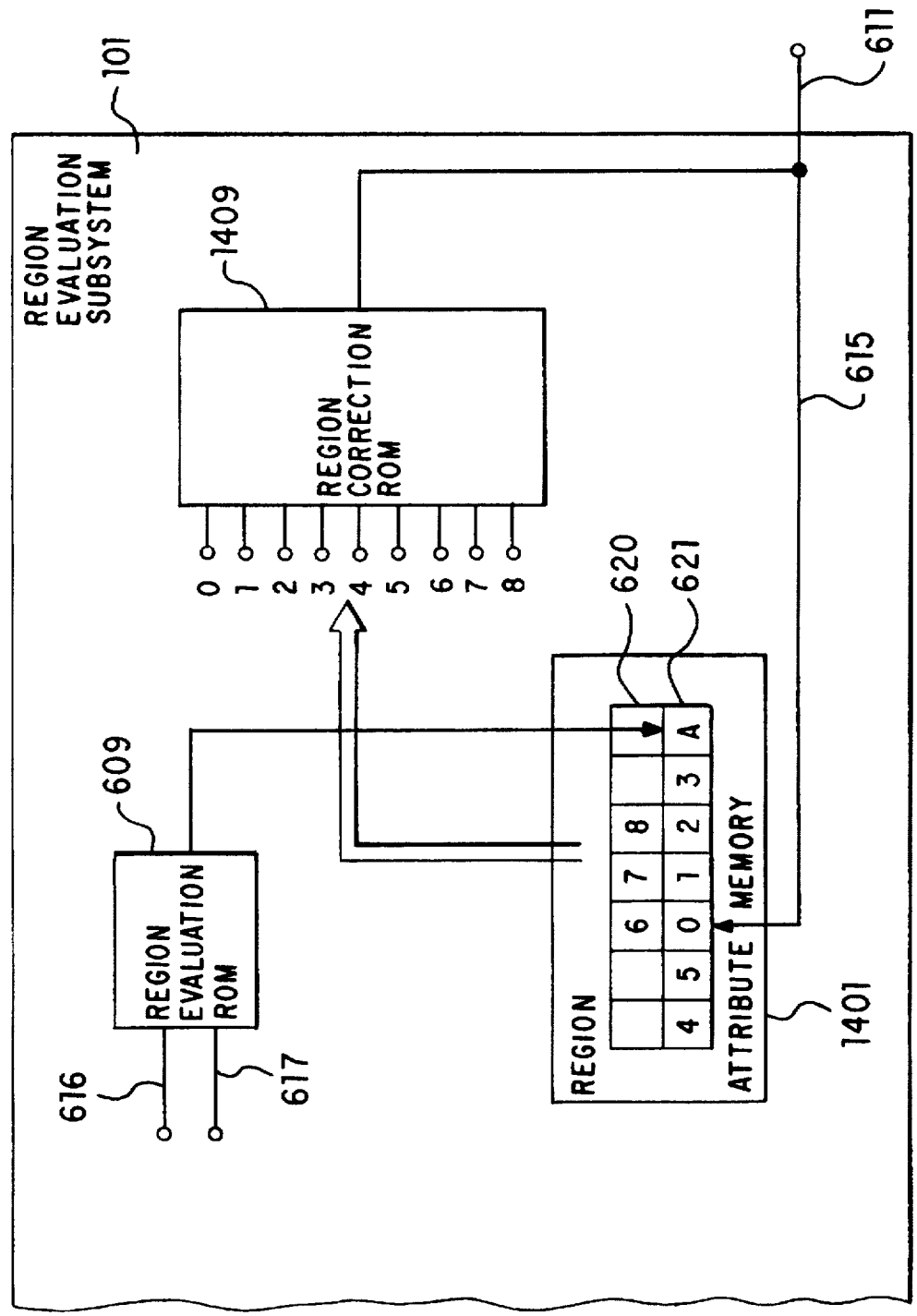
FIG. 16 is a block diagram of a first embodiment of the region correction device of FIG. 15.

FIG. 16 shows in greater detail a first preferred embodiment of the region correction device 1402 and a first preferred embodiment of the region attribute memory 1401. In this first preferred embodiment, the region correction device 1402 is simply a region correction ROM 1409. As shown, in FIG. 16, the region evaluation results for the current block or pixel of the current row 621 evaluated by the region evaluation ROM 609 are stored in the location indicated by "A" in the region attribute memory 1401. Furthermore, when the target block or target pixel is 0 and reference blocks or reference pixels are blocks or pixels 1–8, signals are sent to the region correction ROM 1409 using the attributes of the blocks or pixels 0–8 as input addresses for the region correction ROM 1409. The region correction ROM 1409 stores a table which outputs the attributes of the target block or target pixel 0 based on the pattern formed by the attributes of blocks or pixels 0–8 as the input address. When this pattern matches one of the patterns A–J shown in FIG. 14, a signal which overwrites the attribute of target block 0 is output on signal line 615 to the region attribute memory 1401. The overwrite output from the region correction ROM 1409 is stored in the target block 0 in the region attribute memory 1401. Thus, if the attribute of the target block 0 has been, for example, erroneously evaluated as "1", it is overwritten as "0."

In addition, the output from this region correction ROM 1409 is also used as a two-value signal switching signal output on the signal line 611 to the binary switching unit 610. Thus, if the output from the region correction ROM 1409 is 0, the binary output on the signal line 612 from the continuous tone image processing subsystem 103 is selected; while, if the output from the region correction ROM 1409 is 1, the binary output on the signal line 613 from the binary image processing subsystem 104 is selected.

In FIG. 16, the region correction device 1402 is the region correction ROM 1409. However, region correction device 1402 is not limited to a region correction ROM 1409, and may alternatively be accomplished by a connecting circuit, as shown in FIGS. 17 and 18.

Figure 17:
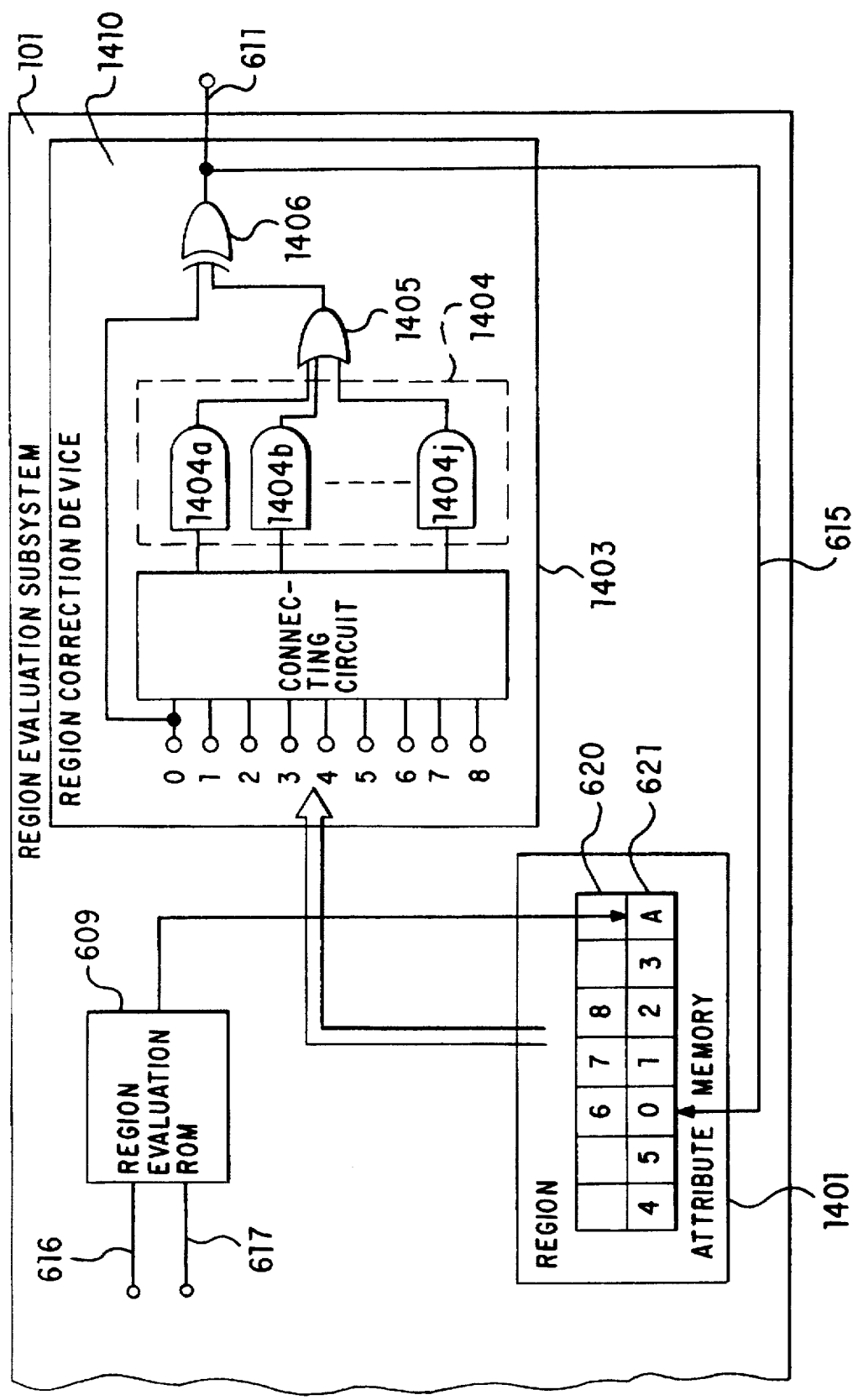
FIG. 17 is a block diagram of a second preferred embodiment of the region correction device of FIG. 15.

FIG. 17 shows a second preferred embodiment of the region correction device 1402 of FIG. 15. As shown in FIG. 17, a connecting circuit 1410 selectively connects the attribute outputs of the target block or pixel and the reference blocks or reference pixels retained in the region attribute memory 1401 as outlined below. A pattern matching circuit 1404 determines whether or not the block or pixel attributes of blocks or pixels 0–8 match one of the patterns A–J shown in FIG. 14. In the pattern matching circuit 1404, one pattern matching circuit device 1404z is required for each pattern Z to be matched against. In this embodiment, since patterns A–J are used to correct the region evaluation attributes, the pattern matching circuit 1404 comprises the pattern matching circuits components 1404a–1404j.

Figure 18:
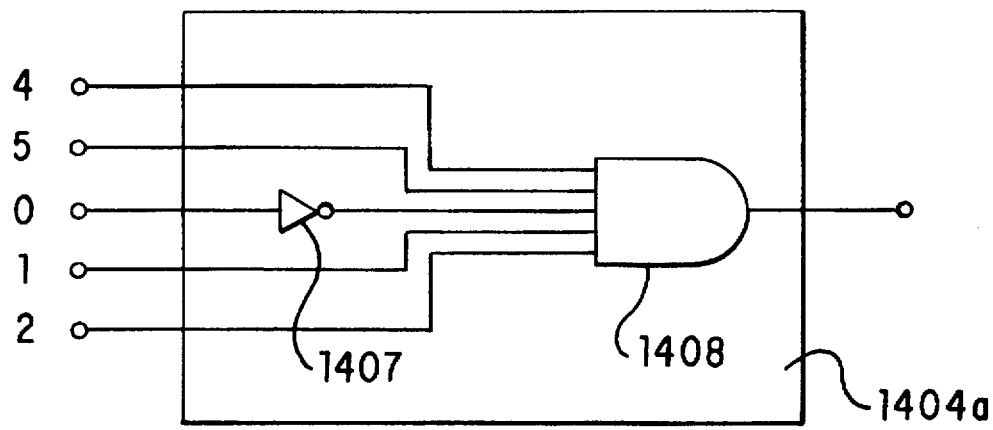
FIG. 18 shows in greater detail the multi-input AND gates of FIG. 17.

FIG. 18 shows one embodiment for the pattern matching circuit component 1404a corresponding to pattern A. The connecting circuit 1410 shown in FIG. 17 selectively connects the outputs of the target and reference blocks or pixels 0–8 to the pattern matching circuit components 1404a–1404j. Thus, as shown in FIG. 18, the connecting circuit 1410 connects the attributes of reference blocks 1, 2, 4 and 5 directly to the AND gate 1408 of the pattern matching circuit component 1404a. The attribute of the target block 0 is connected to the AND gate 1408 via the inverter 1407. Therefore, the output of the pattern matching circuit component 1404a is 1 only when the input pattern matches pattern A shown in FIG. 14. That is, when the attribute of the target block 0 is 0 and the attributes of the surrounding reference blocks 1, 2, 4 and 5 are 1, pattern A of FIG. 14 is matched. Thus, when these signals are transmitted to the pattern matching circuit component 1404a, the output of the pattern matching circuit component 1404a is 1. The connecting circuit 1410 selectively connects the target and reference blocks 0–8 attributes to the proper ones of the pattern matching circuit component 1404a–1404j. Since the pattern matching circuit components 1404a–1404j correspond to the patterns A–J in FIG. 14, the number of inverters 1407 and the insertion positions of the circuits varies for each of the pattern matching circuit components 1404a–1404j.

In FIG. 17, the OR gate 1405 outputs the logical OR of the outputs of the pattern matching circuit components 1404a–1404j. Thus, when one or more of the patterns A–J is matched, the OR gate 1405 outputs a 1. The output of the OR gate 1405 and the evaluation attribute of the target block or pixel are input to an exclusive OR (XOR) gate 1406 that outputs the exclusive logical sum of the output from the OR gate 1405 and the attribute of the target block or target pixel 0. Thus, when the output of the OR gate 1405 is 1, the attribute of the target block or target pixel 0 is reversed. For example, if the input pattern matches pattern A, a 1 is output from the pattern matching circuit component 1404a and is input to the XOR gate 1406 via the OR gate 1405. The attribute of the target block or target pixel 0, which is 0 because the target block has been erroneously determined to be a continuous tone region, is also input to the XOR gate 1406. Thus, a 1 is output from the XOR gate 1406 on the signal line 615 and thus is written into the region attribute memory 1401 as the corrected attribute of the target block or target pixel 0, overwriting the current incorrect target block or target pixel attribute of 0. The output from the XOR gate 1406 is also transmitted on the signal line 611 to the binary switching unit 610.

In this second preferred embodiment, the attribute of the target block or target pixel is continually updated, but the region correction device 1402 may be designed such that the attribute is updated only when the output of the OR gate 1405 is 1.

Figure 19:
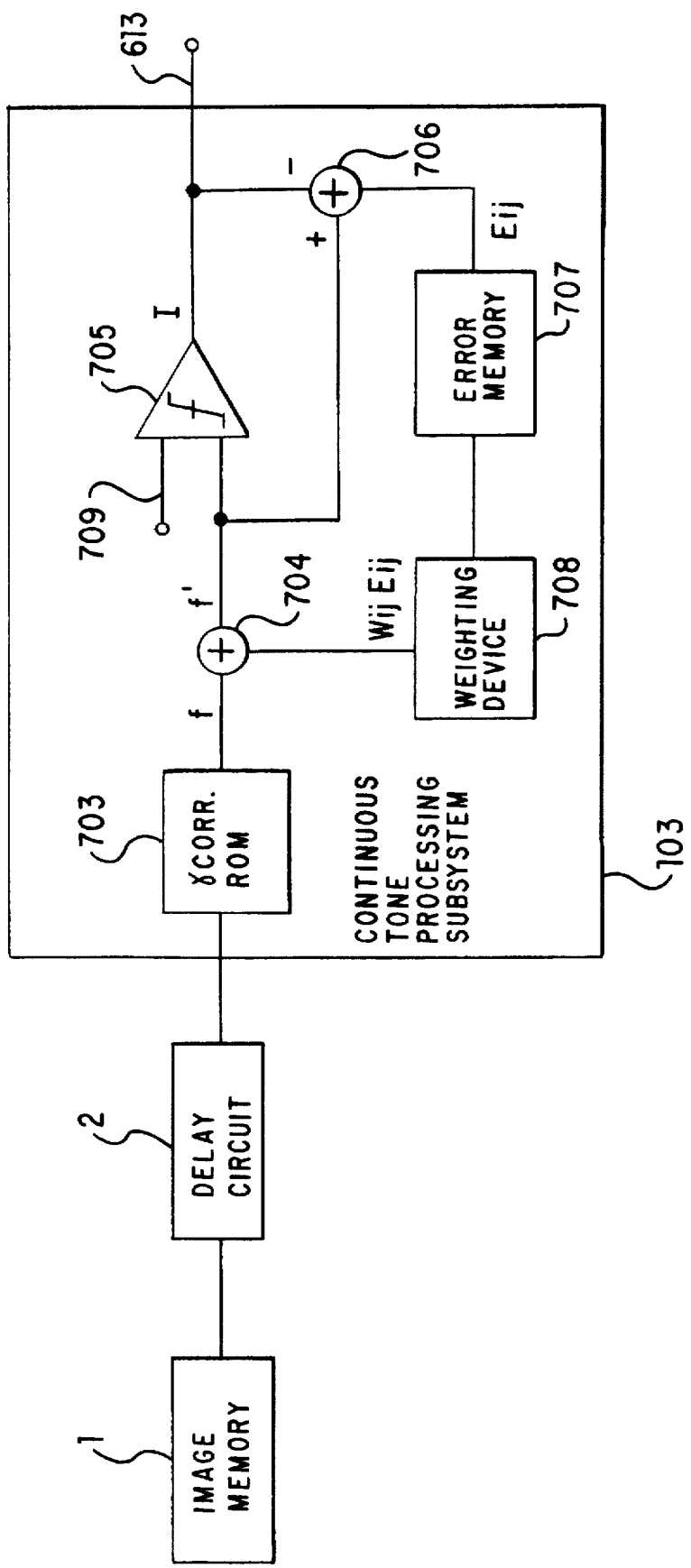
FIG. 19 is a block diagram of a second preferred embodiment of the continuous tone processing subsystem.
Figure 20:
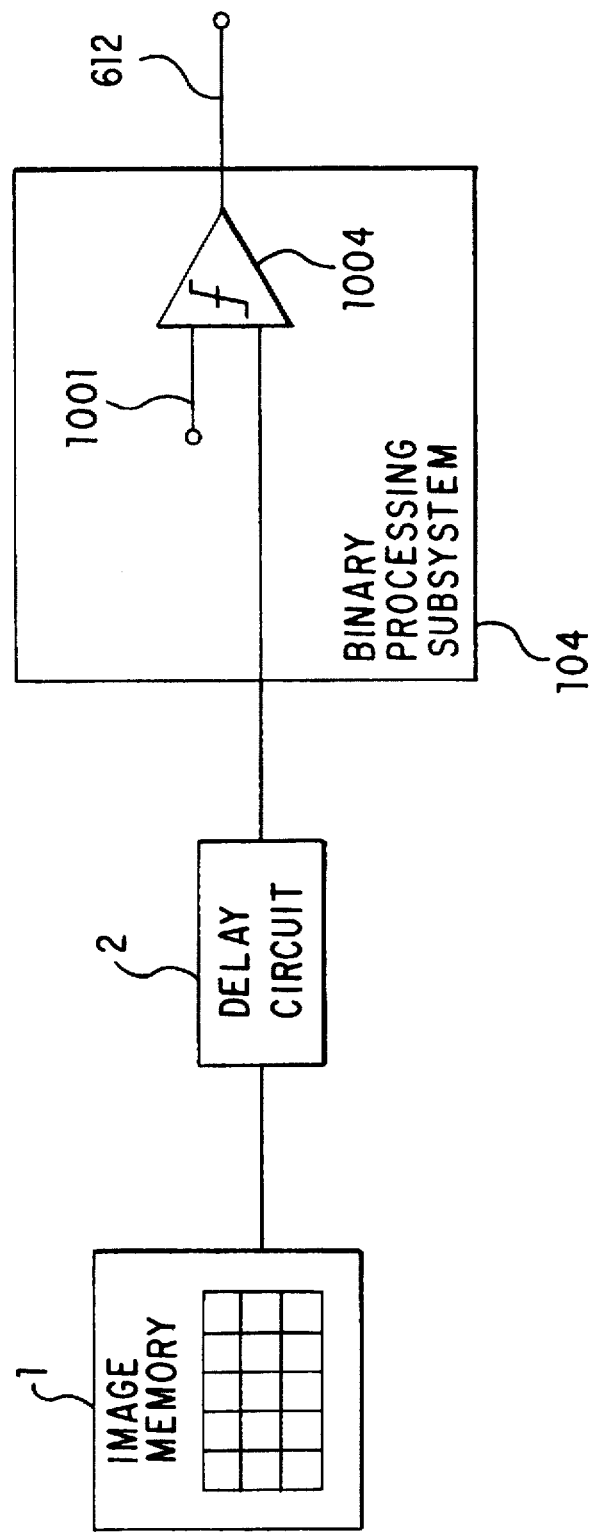
FIG. 20 is a block diagram of a second preferred embodiment of the binary processing subsystem.

FIGS. 19 and 20 show second preferred embodiments of the continuous tone image processing subsystem 103 and the binary image processing subsystem 104. In general, these second embodiments include the same elements and functional connections as the first preference embodiments shown in FIGS. 8 and 11, respectively. In the second preferred embodiments shown in FIG. 19 and FIG. 20, the only difference from the first preferred embodiments shown in FIGS. 8 and 11 is that a delay circuit 2 is inserted between the image memory 1 and the gamma correction ROM 703 of the continuous tone image processing subsystem 103 shown in FIG. 19, and between the image memory 1 and the comparator 1004 of the binary image processing subsystem 104 shown in FIG. 20. Most efficiently, the same delay 2 is used to supply the delayed block to both the gamma correction ROM 703 and the comparator 1004.

Since a 4-block or 4-pixel delay exists between the region evaluation by the region evaluation ROM 609 for a block or pixel and the region correction by the region correction device 1402 for that same block or pixel in the second preferred embodiment of the region evaluation subsystem 101 shown in FIG. 15, the delay circuit 2 temporarily stores and then synchronizes the image signal read from the image memory 1, so that the corresponding binary output signal for that same block or pixel is selected only after region correction has been completed on that same block or pixel. It is also acceptable to insert a reading regulating circuit in place of the delay circuit 2 and to regulate the timing of the reading of the image signal from the image memory 1 to synchronize the binary outputs of the continuous tone image processing subsystem 103 and the binary image processing subsystem 104 with the region evaluation subsystem 101.

An alternate method for the region correcting procedure of step S1107 is shown in FIGS. 21A and 21B. The method outlined in FIGS. 21A and 21B is a majority determining method which determines the frequency of appearance of the attributes in the target block and the reference blocks or the target pixel and reference pixels, and selects the most frequently appearing attribute as the attribute of the target block or target pixel. In FIG. 21A, only the row 621 currently being processed is used to provide the reference blocks or pixels. In FIG. 21A, the two blocks or pixels positioned before the target block or pixel and the two blocks or pixels positioned after the target block or pixel in the current row 621 are used as the reference blocks or pixels. The attribute most frequently appearing in these five blocks or five pixels is used as the attribute for the target block or target pixel. In FIG. 21B, both the row 621 currently being processed and the last row 620 just completed are used to provide the reference blocks or pixels. In FIG. 21B, the same 5 blocks or pixels are used as in FIG. 21A, plus the 5 blocks or pixels in the last row 620 which are edge-wise adjacent to the 5 blocks or pixels of the current row 621 are also used as the reference blocks or pixels. Thus, the attribute of the majority of the ten blocks or ten pixels is used as the attribute of the target block or target pixel.

The majority determining method has a disadvantage relative to the pattern matching method shown in FIGS. 13 and 14, in that, since the attribute appearance or pattern is not analyzed, the certainty of the correction slightly decreases. However, the majority determination method has an advantage, in that the complexity of the procedure does not increase even if the number of reference blocks increases. Thus, when the number of reference blocks is large, the majority determining method is preferable over the pattern matching method.

FIG. 22 shows a third preferred embodiment of the region correction device 1402 of FIG. 15. In FIG. 22, the region evaluation ROM 609 and the region attribute memory 1401 are the same as shown in FIG. 15. In FIG. 22, the region correction device 1402 includes a counter 1901, which reads in the attribute for each block or pixel from the region attribute memory 1401 and determines the number of appearances of either the binary attribute or the continuous tone attribute. Thus, for FIGS. 21A and 21B, the calculated value ranges from 0–5 or 0–10, respectively, because the number of blocks is five or 10, respectively. This determined value is input to a comparator 1902, where it is compared with a threshold value input on the signal line 618. For FIGS. 21A and 21B the preferred threshold value is 3 and 6, respectively. The output of the comparator is thus the corrected attribute, and is input to the attribute memory 1401 on the signal line 615. When the determined value of the selected attribute (either binary or continuous tone) is greater than the threshold value, the attribute of the target block or pixel is set to the selected attribute. When the determined value is less than the threshold value, the attribute is taken as the non-selected attribute (either continuous tone or binary). The output from the comparator 1902 is also output as the selection signal, which is transmitted to the binary signal switching unit 610 on the signal line 611.

In the second preferred embodiment of the region evaluation subsystem 101 shown in FIG. 15 and the method shown in FIG. 12, the region evaluation accuracy can be further improved because incorrect region evaluations are corrected based on the attributes of the surrounding blocks after it has been determined whether or not the region is a binary region or a continuous tone region.

In general, when evaluations are carried out for each block, since inappropriately converted binary images end up being output for entire blocks which are erroneously evaluated, the errors have a tendency to stand out. In particular, when the state changes from a binary region to a continuous tone region, or from a continuous tone region to a binary region, errors on the transition boundaries stand out.

Figure 23:
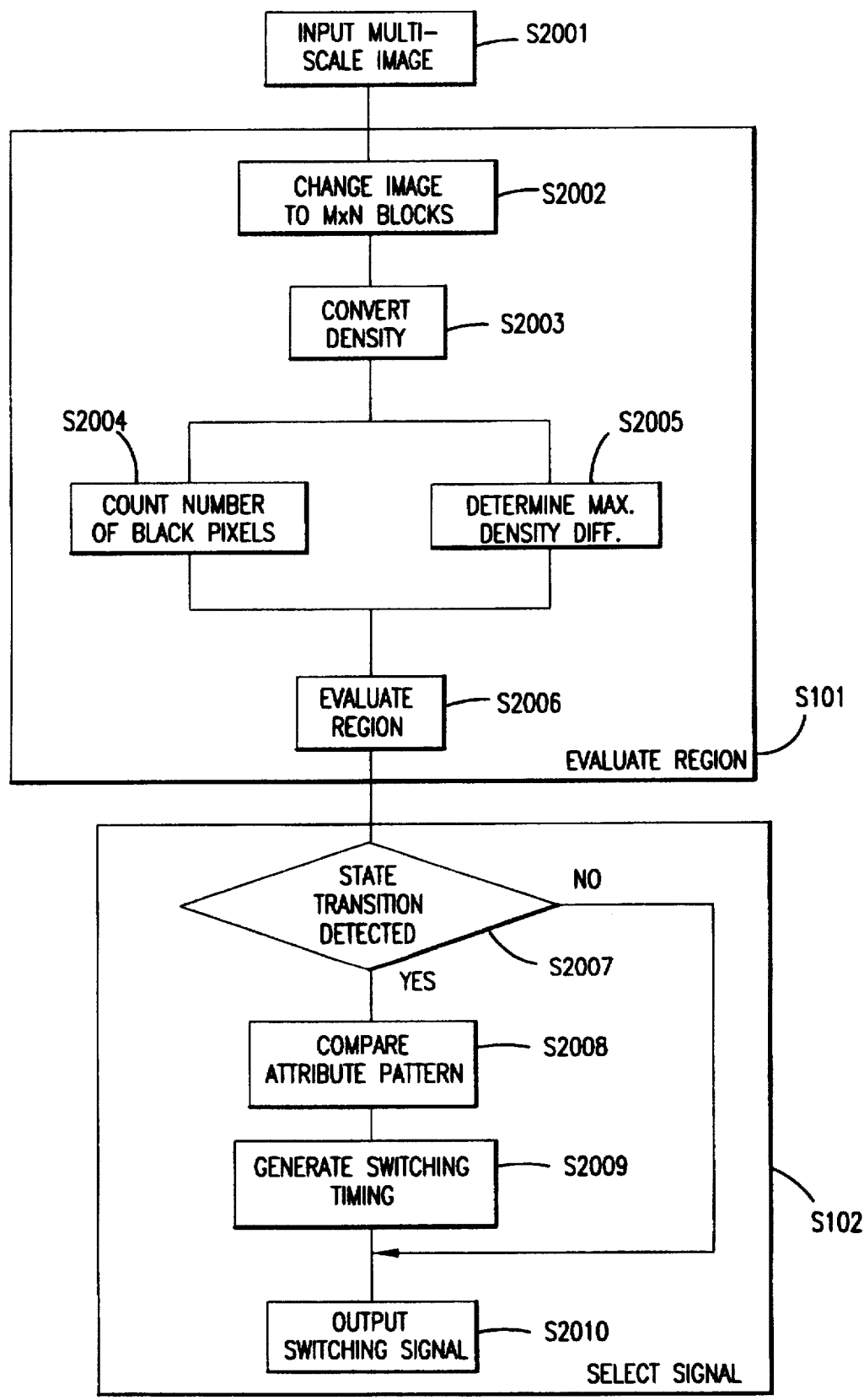
FIG. 23 is a flow chart outlining the first preferred embodiment of the region evaluation process used with a first preferred embodiment of the signal selection process.

In third preferred embodiments of the region evaluation method and subsystem 101, blocks in which state transition boundaries exist are detected. FIG. 23 shows a flow chart outlining a third preferred embodiment, comprising the first preferred embodiment of the region evaluation process S101 and a first preferred embodiment of a signal selecting process S102. Steps S2001–S2006 are identical to steps S201–S206 of the first preferred embodiment shown in FIG. 3. Accordingly, a detailed description of these steps is omitted. However, step S207 of the first preferred embodiment shown in FIG. 3 has been replaced with the signal selecting process S102 shown in the third preferred embodiment shown in FIG. 23.

In the signal selecting process S102, in step S2007, the attribute of the target block is checked to determine if the state of the evaluation attribute, relative to either laterally adjacent block, has changed from binary region to continuous tone region, or from continuous tone region to binary region, or in other words, whether or not the state has changed. If, in step S2007, it is determined that the state has changed, the attributes of the surrounding blocks for which the evaluation procedure has been completed are compared in step S2008. That is, in step S2008, the frequency of appearance of the binary region attribute and the continuous tone region attribute among the attributes of the reference blocks and the target block are compared. Then, in step S2009, a switching timing is generated for the binary output within the target block. In step S2010, when a state transition has thus occurred, the selection of the binary output signal within the block is changed and the binary output signals are selectively output by the switching timing. That is, the output source for the output signal for the target block is altered, as the output signal is output. In the previous embodiments, once the output source is selected for a target block, that source is used for all the pixels of that block. In contrast, in this third preferred embodiment, the output source selected during the signal selection process S102 is changed for some of the pixels of the target block.

Conversely, if it is determined in step S2007 that no state transition exists in the target block, control jumps directly to step S2010, where the switching signal is output based on the region evaluation result from step S2006.

Figure 24:
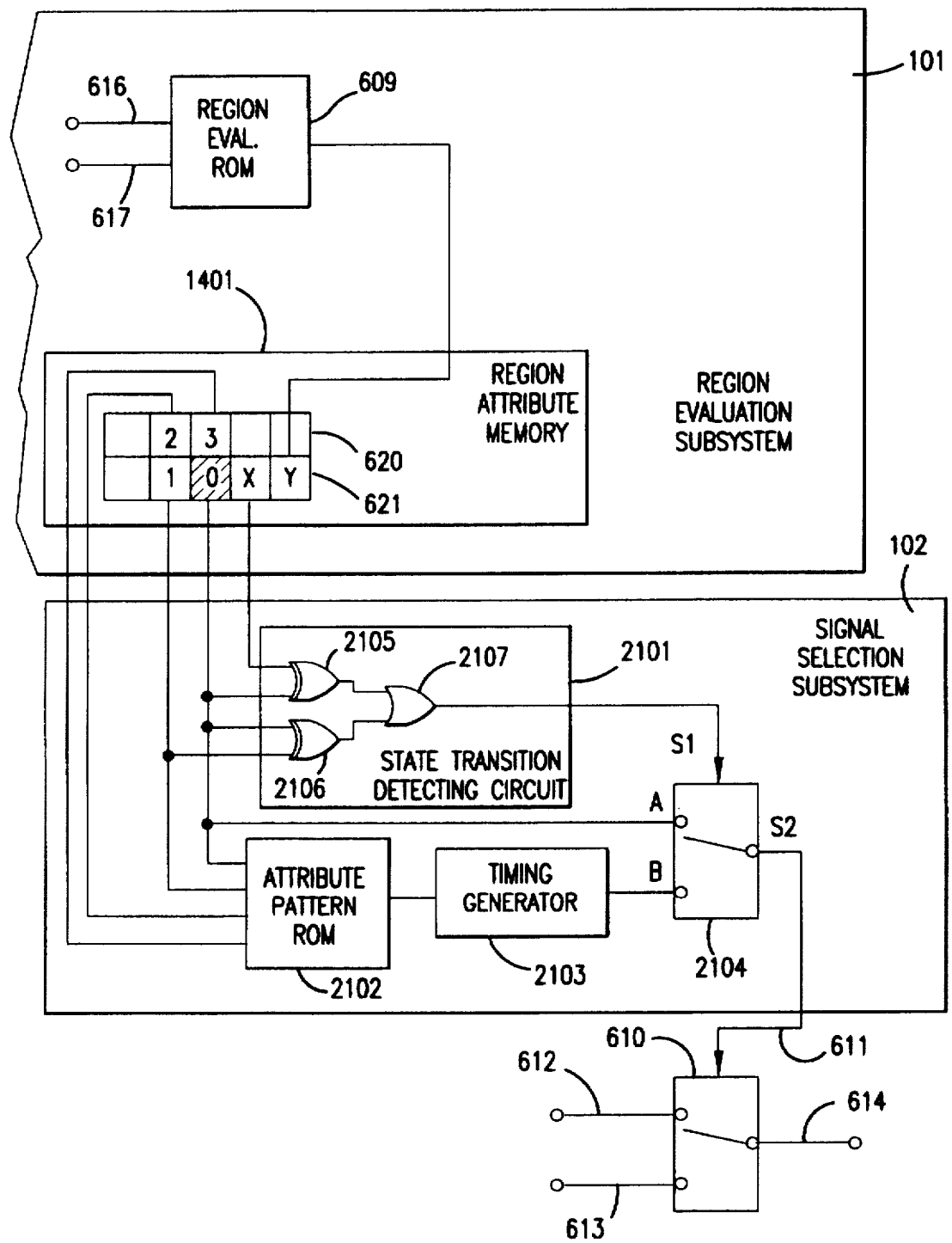
FIG. 24 is a block diagram of a third preferred embodiment of the image processing system comprising the first preferred embodiment of the region evaluation subsystem and a first preferred embodiment of the signal selection subsystem.

FIG. 24 shows a third preferred embodiment of the image processing system 100, comprising the first preferred embodiment of the region evaluation subsystem 101 and a first preferred embodiment of the signal selection subsystem 102. In FIG. 24, the image memory 1 through the region evaluation ROM 609 are the same as shown in FIG. 7. As in the second embodiment shown in FIG. 15, the region evaluation result for the current block being evaluated by the region evaluation ROM 609 is stored in area Y of the region attribute memory 1401. In the region attribute memory 1401, the target block 0 is surrounded by the reference blocks 1–3 and X–Y.

The signal selecting subsystem 102 includes a state transition detecting circuit 2101, an attribute pattern ROM 2102, a timing generator 2103, and a switching unit 2104. The state transition detecting circuit 2101 detects if the target block attribute has changed, and includes two XOR gates 2105 and 2106 and an OR gate 2107, which outputs the logical OR of the output from the XOR gates 2105 and 2106. The XOR gate 2105 is connected to the reference block X and the target block 0 of the region attribute memory 1401, while the XOR gate 2106 is connected to the reference block 1 and the target block 0. The XOR gates 2105 and 2106 each output a 1 only when the values are different for the blocks X and 0, and the blocks 1 and 0, respectively, which indicates a state transition has occurred. The outputs of the XOR gates 2105 and 2106 are connected to the OR gate 2107. The output of the OR gate 2107 is input to the control input S1 of the switching unit 2104. The attribute signal of each block 0–3 and X–Y is 1 for the binary region attribute and 0 for the continuous tone region attribute.

The attribute pattern ROM 2102 inputs the attributes of the target block 0 and the reference blocks 1–3 as input addresses, and outputs patterns based on the input attribute values. The timing generator 2103 generates a switching signal based on the output of the attribute pattern ROM 2102. The switching signal is output to the B input of the switching unit 2104, while the attribute value of the target block 0 is output to the A input of the switching unit 2104.

When a state transition has not occurred between either the blocks 1 and 0, or between the blocks X and 0, the output of the OR gate 2107 is 0. In response to a 0 on the control input S1, the switching unit 2104 selects the A input. The switching unit 2104 thus selects and transmits the region evaluation result from the region evaluation ROM 609 for the target block 0 to the signal line 611. When a state transition has occurred between either or both of the sets of blocks 0 and 1, or blocks 0 and X, the output of the OR gate 2107 is 1. In response to a 1 on the control input SI, the switching unit 2104 selects the B input. The switching unit 2104 thus selects and transmits the switching signal from the timing generator 2103 to the signal line 611.

In other words, when a state transition has not occurred, the input A, corresponding to the region evaluation result from the region evaluation ROM 609 for the target block 0, is connected by the switching unit 2104 to the binary signal switching unit 610 by the signal line 611. When a state transition has occurred, the input B, generated by the timing generator 2103 based on the output of the attribute pattern ROM 2102, is connected to the binary signal switching unit 610 by the signal line 611.

Figure 25:
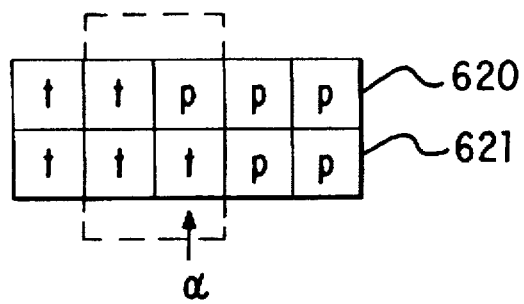
FIG. 25 illustrates the selection of the 4-block region used by the signal selection subsystem of FIG. 24.

FIG. 25 shows the region evaluation results for two rows of blocks 620 and 621. The region evaluation procedure is completed for row 620, while the region evaluation procedure is in process for row 621. In FIG. 25, each block comprises 16 pixels in the horizontal row (i.e. M=16) and an indeterminant number of rows n. In FIG. 25, t indicates that the entire block has been determined to be a binary region block, while p indicates that the entire block has been determined to be a continuous tone region block. The block indicated by the arrow α is the target block 0. In FIG. 25, the target block 0, which should have been determined to be a continuous tone region p, has been erroneously determined to be a binary region t.

Figure 26:
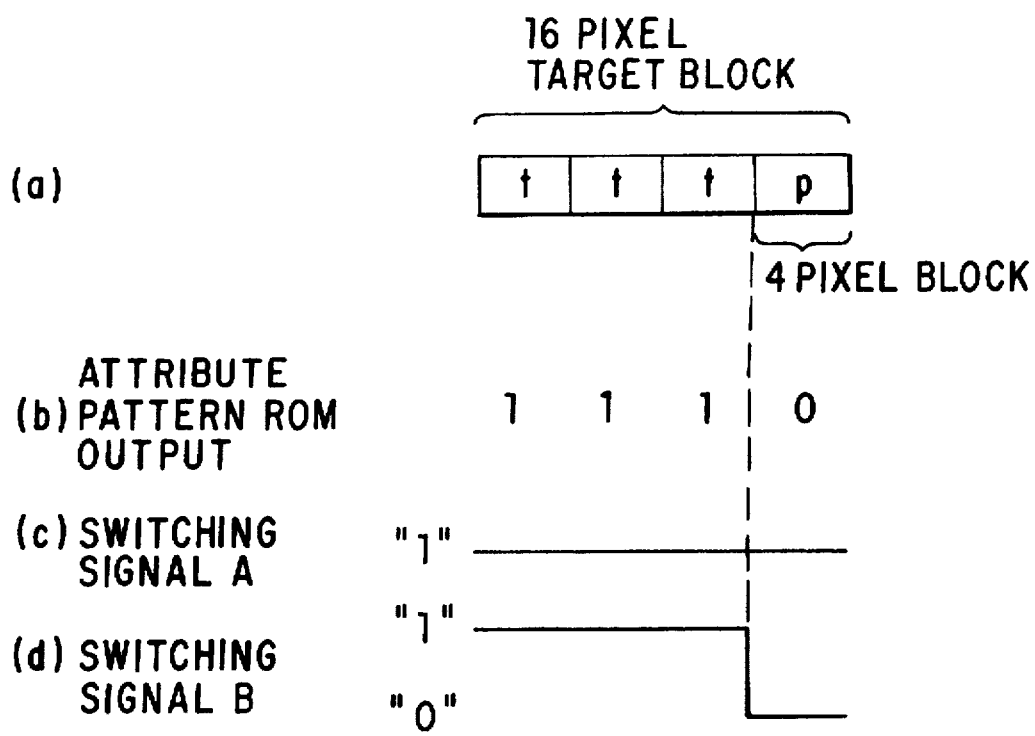
FIG. 26 illustrates the inputs to the switching unit of the signal selection subsystem for the 4-block region shown in FIG. 25.

When the attributes of the target block and the reference blocks, as shown in FIG. 25 by the dotted line and in part (a) of FIG. 26, are transmitted to the attribute pattern ROM 2102, the output pattern shown in part (b) of FIG. 26 is obtained. That is, in this example, the input to the attribute pattern ROM 2102 is the attributes for the four blocks surrounded by the dotted line in FIG. 25. Based on the attributes of this 4-block portion, since three blocks have been evaluated as being binary regions and only one has been evaluated as being a continuous tone region, an output pattern of "1110" is obtained from the attribute pattern ROM 2102. This output pattern considers the appearance frequency of each attribute and the attribute pattern of the block, and is formed so as to preserve attribute continuity.

In FIG. 25, considering the five horizontally aligned units as a single block, the second and third blocks from the left are taken as boundaries. Thus, the left side of the resulting block, as shown in part (a) of FIG. 26, is a binary region for characters or the like, and the right side is the continuous tone region for a photograph or the like. If, instead, the output pattern is taken to be "0111", because, in FIG. 25, the left side is a binary region and the right side is a continuous tone region, the error stands out noticeably because a continuous tone region exists on the left side, and the region no longer matches the surrounding attributes. Thus, at this point, the output "1110" is obtained from the attribute pattern ROM 2102, as shown in part (b) of FIG. 26.

The timing generator 2103 which receives this pattern "1110" outputs a switching signal to the B input of the switching unit 2104, as shown in part (d) of FIG. 26, based on the described pattern "1110", corresponding to the 4-pixel blocks of the 16 pixels which form each horizontal row of the target block 0, as shown in part (a) of FIG. 26.

If the output at this point is the same as the region evaluation result from the region evaluation ROM 609 input on the input A of the switching unit 2104, since the entire block is evaluated as a binary region, a switching signal input to the A input (in this case, a 1, indicating a binary region, such as is shown in part (c) of FIG. 26), is transmitted from the switching unit 2104 to the binary signal switching unit 610 on the signal line 611. This target block, which originally should have been processed as a continuous tone region, is thus entirely processed as a binary region.

However, an output of "1110" is obtained from the attribute pattern ROM 2102, as shown in part (b) of FIG. 26. As shown in part (d) of FIG. 26, a switching signal input to the B input and corresponding to the pattern "1110" is transmitted from the switching unit 2104 to the binary signal switching unit 610 on the signal line 611. Thus, since 0, indicating a continuous tone region, is transmitted to the binary signal switching unit 610 for the fourth 4-pixel block of the four 4-pixel blocks formed from the 16 pixels forming each row of the target block, or in other words, for ¼ of the target block 0, it becomes possible to carry out the correct procedure for ¼ of the target block 0.

There are many cases in which the error shown in FIG. 25 occurs when the block catches on the edge of the photograph region. Even if one portion of the block is not correctly output, the binary image output is clean. In addition, since blocks for which state transition has occurred do not necessarily contain errors, there is a possibility that a mistaken procedure will be accomplished for correctly evaluated blocks, but these errors will not stand out noticeably in the output binary images.

The continuous tone image processing subsystem 103 and the binary image processing subsystem 104 connected to the first preferred embodiment of the region evaluation subsystem 101 and the first preferred embodiment of the signal selection subsystem 102 in this third preferred embodiment of the image processing system 100 are the same as those shown in FIGS. 19 and 20. However, since the region evaluation result is written into block Y and the binary output is selected for the target block 0, the delay interval of the delay circuit 2 is equivalent to a 2-block portion.

As described above, in this third embodiment of the image processing system 100 comprising the first preferred embodiment of the region evaluation subsystem 101 and the first preferred embodiment of the signal selection subsystem 102, a determination is made, based on the maximum density difference and the number of black pixels, whether or not the target block is a continuous tone region. State transitions of the region attribute are then detected between the target blocks and the immediately adjacent blocks of the same row. When no state transition exists, the binary output is selected based upon the region evaluation result. When a state transition exists, the region attributes of the target and surrounding blocks are compared, to selectively switch between the two binary output signals within the target block. Thus, ultimately, the error of a binary image that has been output does not stand out noticeably.

Figure 27:
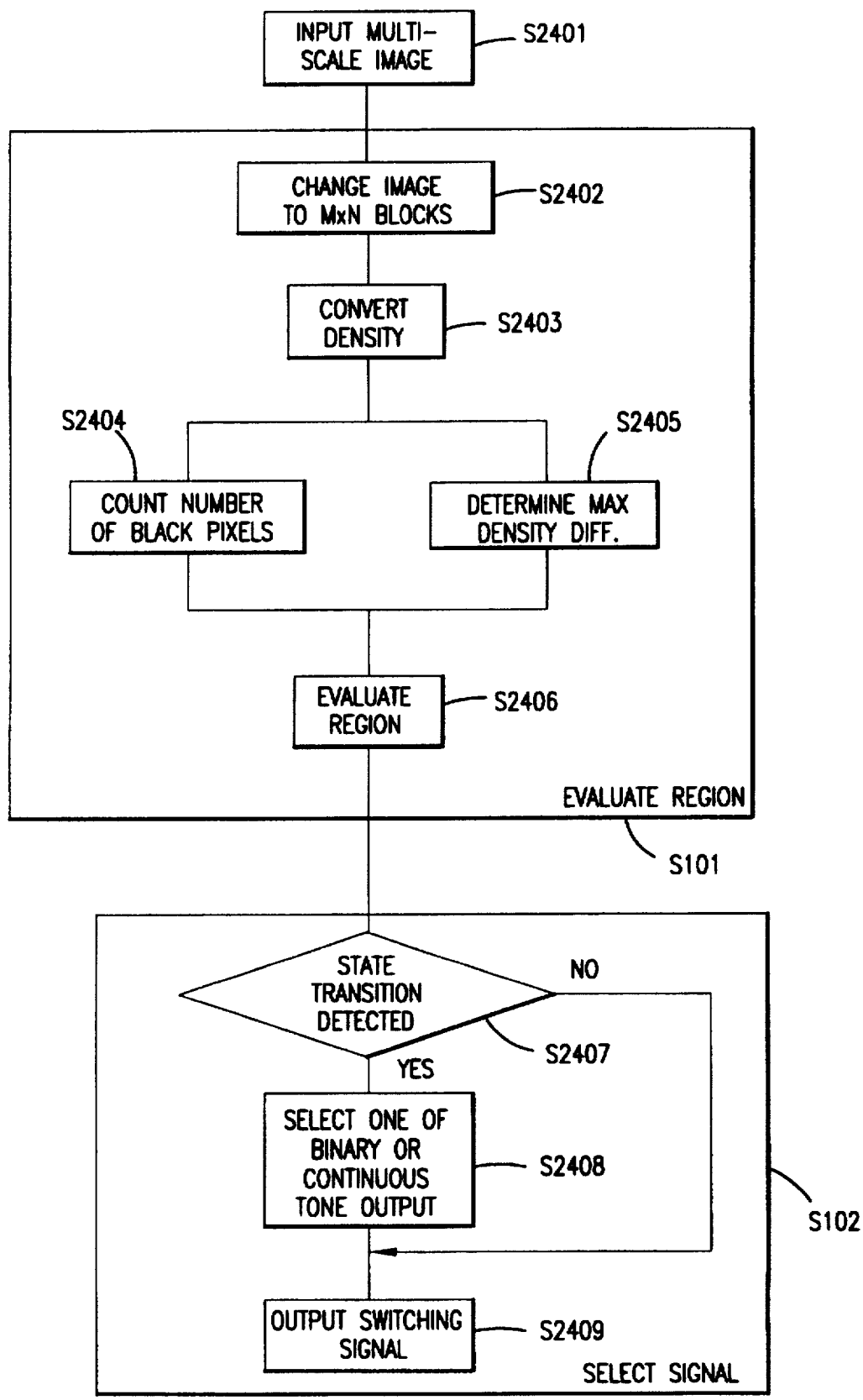
FIG. 27 is a flow chart outlining the first preferred embodiment of the region evaluation process used with a second preferred embodiment of the signal selection process.

FIG. 27 outlines a flow chart of a fourth preferred embodiment of the image processing system 100, comprising the first preferred embodiment of the region evaluation process S101 and a second preferred embodiment of the signal selecting procedures S102. Since steps S2401-S2406 are the same as steps S201-S206 of the first-third preferred embodiments of the region evaluation process S101, a detailed description of these steps is omitted.

As shown in FIG. 27, in step S102, if, in step S2407, a state transition is detected, step S2408 is performed. Otherwise, step S2409 is performed. In step S2408, the program determines whether to employ a binary region conversion process or a continuous tone conversion process to generate the binary output signal. Then, in step S2409, a selected switching signal is output, based on the conversion process selected in step S2408 when a state transition has occurred, or based on the region evaluation result when no state transition has occurred.

In step S2408, the density of the input pixel signal, after the conversion to the 16 level form, is checked to determine if the density is 1 or below (black), 13 or above (white), or between 2-12 (grey). If, in step S2408, the pixel signal density is 1 or below, or 13 or above, the binary conversion process is selected. However, in step S2408, if the density is between 2-12, the continuous tone conversion process is selected.

Figure 28:
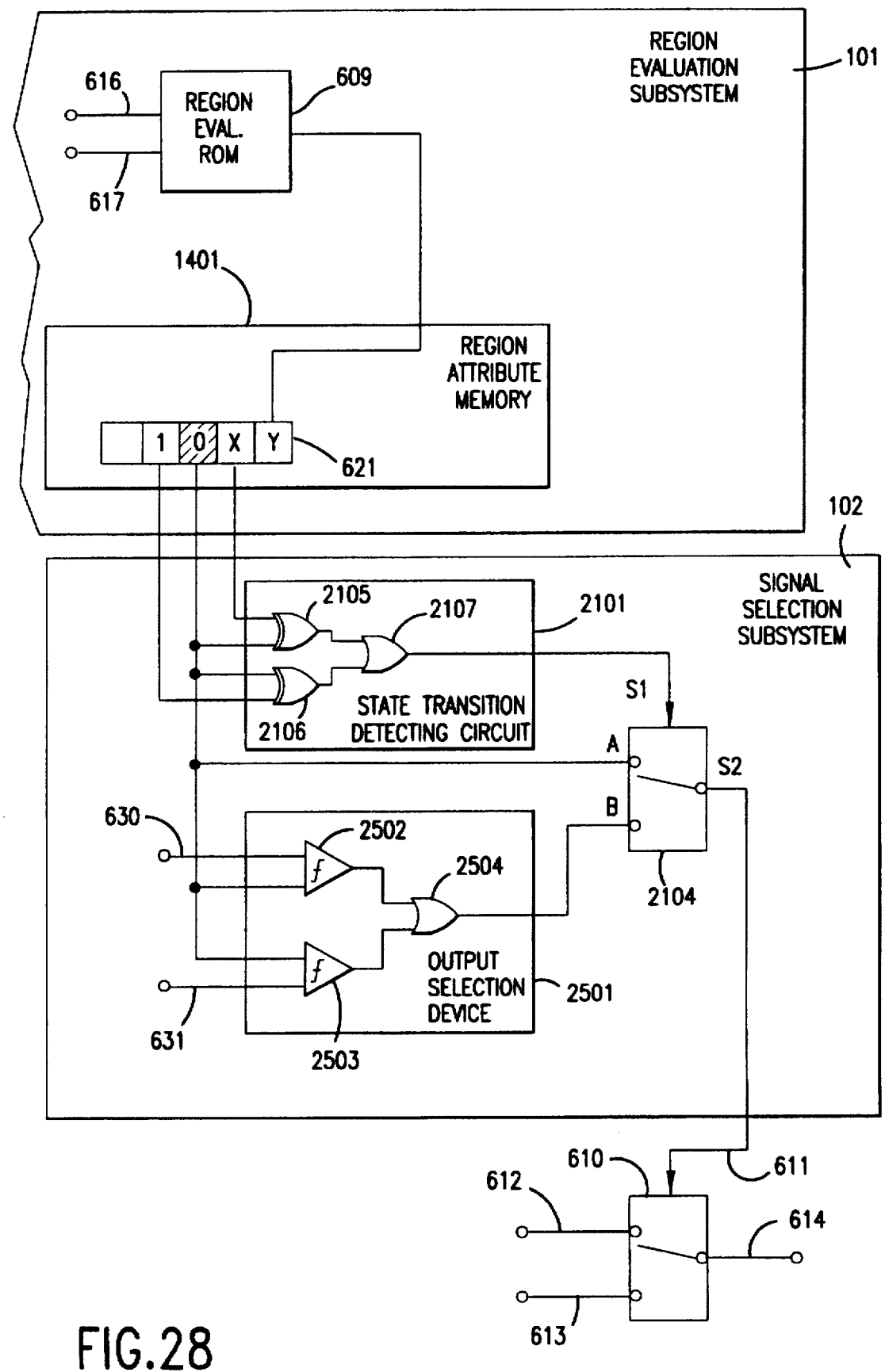
FIG. 28 is a block diagram of a fourth preferred embodiment of the image processing system comprising the first preferred embodiment of the region evaluation subsystem and a second preferred embodiment of the signal selection subsystem.

In FIG. 28, the image memory 1 through the region evaluation ROM 609 are the same as in the first preferred embodiment shown in FIG. 7. The region evaluation result for the current block Y from the region evaluation ROM 609 is stored in the region attribute memory 1401.

The signal selection subsystem 102 includes the state transition detecting circuit 2101, an output procedure selecting circuit 2501, and the switching unit 2104. The output procedure selecting circuit 2501 includes two comparators 2502 and 2503 and an OR gate 2504. The output procedure selecting circuit 2501 transmits a "1" to the B input of the switching unit 2104 when the density of each pixel of the target block 0 is 1 or below (black) or 13 or above (white), and transmits a 0 to the B input of the switching unit 2104 if the density of each pixel is between 2–12 (grey).

When a state transition has not occurred, the described switching unit 2104 selects and transmits the region attribute of the target block 0 which corresponds to the region evaluation result from the region evaluation ROM 609. When a state transition has occurred, the switching unit 2104 selects and transmits the output of the output procedure selecting circuit 2501, which is input on the B input. In other words, when a state transition has not occurred, the region evaluation result from the region evaluation ROM 609 is transmitted by the switching unit 2104 to the binary signal switching unit 610 on the signal line 611. When a state transition has occurred, the output of the output procedure selecting circuit 2501 is transmitted to the binary signal switching unit 610 on the signal line 611. The binary signal switching unit 610 operates as described in the first preferred embodiment shown in FIG. 7.

Figure 29:
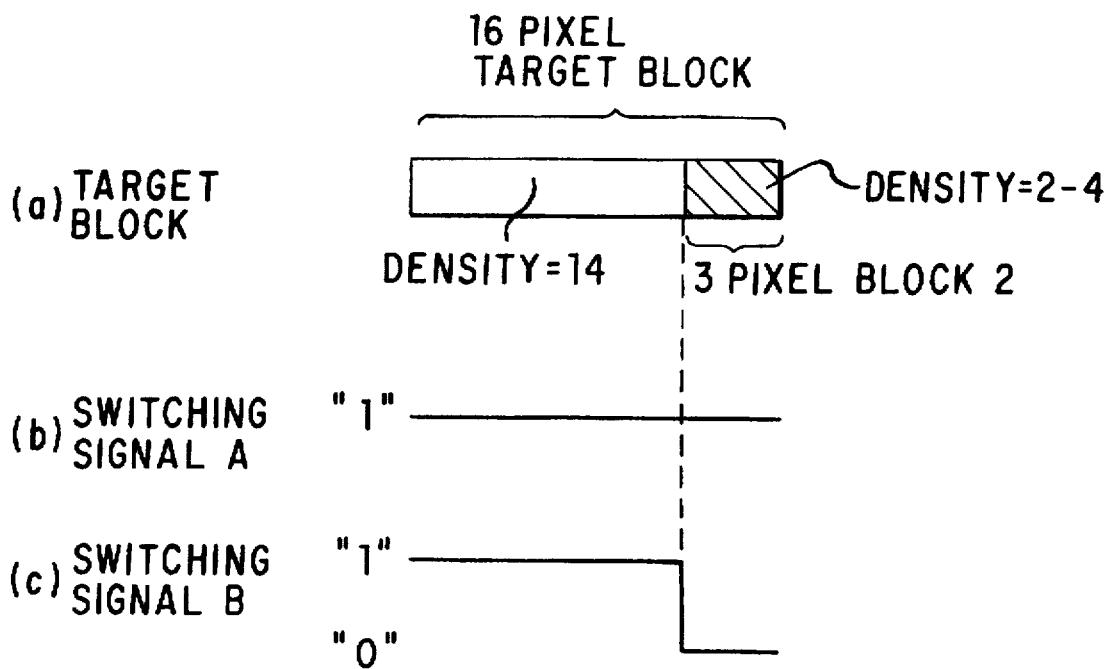
FIG. 29 illustrates the inputs to the switching unit of the signal selection subsystem of FIG. 28 for a 16-pixel block.

As shown in FIG. 29, the block size is 16 pixels in each row, with the number of rows n is indeterminate. The density of the three pixel block Z is 2–4, and the density of the other 12 pixels is 14. In such a state, the block appears in the state in which it has caught on the edge portion of the intermediate tone region. In this case, since the number of black pixels is 3 and the maximum density difference is 12, the block which should have been evaluated as a continuous tone region is erroneously evaluated as a binary region.

When the pixel signal of the type of the target block 0 shown in part (a) of FIG. 29 is input to the output procedure selection circuit 2501, a binary conversion processing selection signal (=1) is output from the output procedure selection circuit 2501, as shown in part (c) of FIG. 29, for those pixels having a density 14, while, for those pixels having a density 2–4, a continuous tone processing selection signal (=0) is output. Conversely, if the output is to be the same as the region evaluation result based on the results of the state transition detection device 2101, the region evaluation result (=1) input to the A input of the switching unit 2104 is output, as shown in part (b) of FIG. 29.

However, when the fourth preferred embodiment of the method is used, the correct procedure can be accomplished for the correct binary output based on the continuous tone portion. Since blocks for which a state transition has occurred do not necessarily contain errors, there is a possibility of selecting the wrong binary conversion procedure for correctly evaluated blocks. However, since the binary conversion procedure is selected based on the pixel density, the errors do not stand out in the output binary image.

The continuous tone image processing subsystem 103 and the binary image processing subsystem 104 connected to the first preferred embodiment of the region evaluation subsystem 101 and the second preferred embodiment of the signal selection subsystem 102 in this fourth preferred embodiment of the image processing system 100 are the same as those shown in FIGS. 19 and 20. However, since the region evaluation result is written into block Y and the binary output is selected for the target block 0, the delay interval of the delay circuit 2 is equivalent to a 2-block portion.

As described above, in this fourth preferred embodiment of the image processing system 100 comprising the first preferred embodiment of the region evaluation subsystem 101 and the first preferred embodiment of the signal selection subsystem 102, a determination is made, based on the maximum density difference and the number of black pixels, whether or not the target block is a continuous tone region. State transitions of the region attribute are then detected between the target blocks and the immediately adjacent blocks of the same row. When no state transition exists, the binary output is selected based upon the region evaluation result. When a state transition exists, the region attributes of the target and surrounding blocks are compared, to selectively switch between the two binary output signals within the target block. Thus, ultimately, the error of a binary image that has been output does not stand out noticeably.

Figure 30:
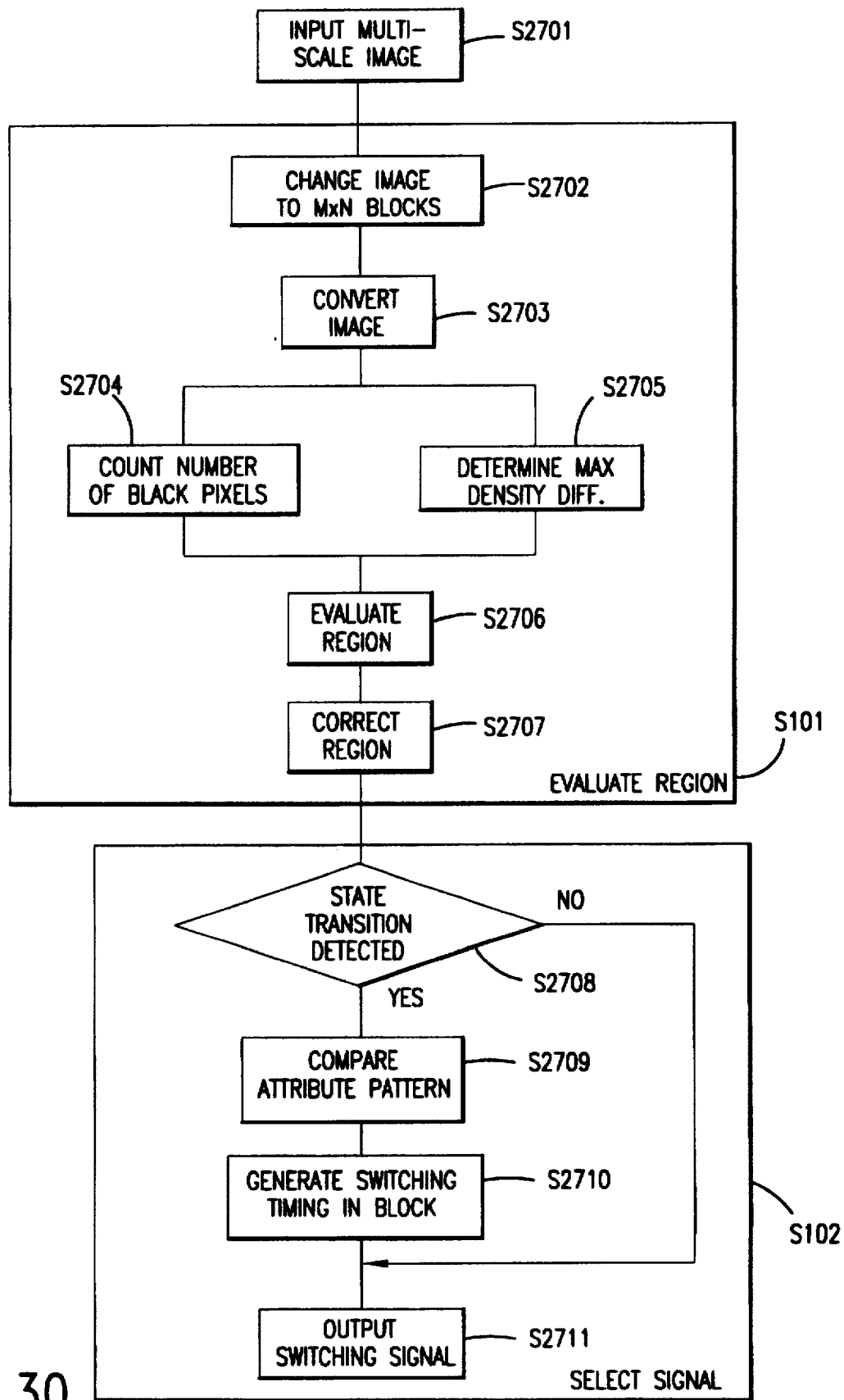
FIG. 30 is a flow chart outlining the second preferred embodiment of the region evaluation process used with the first preferred embodiment of the signal selection process.

FIG. 30 shows a flow chart outlining a fifth preferred embodiment for the image processing method, comprising the second preferred embodiment of the region evaluation process S101 and the first preferred embodiment of the signal selection process S102. Accordingly, as these processes are fully described with reference to FIGS. 12 and 23, any further discussion of these steps is omitted.

Figure 31:
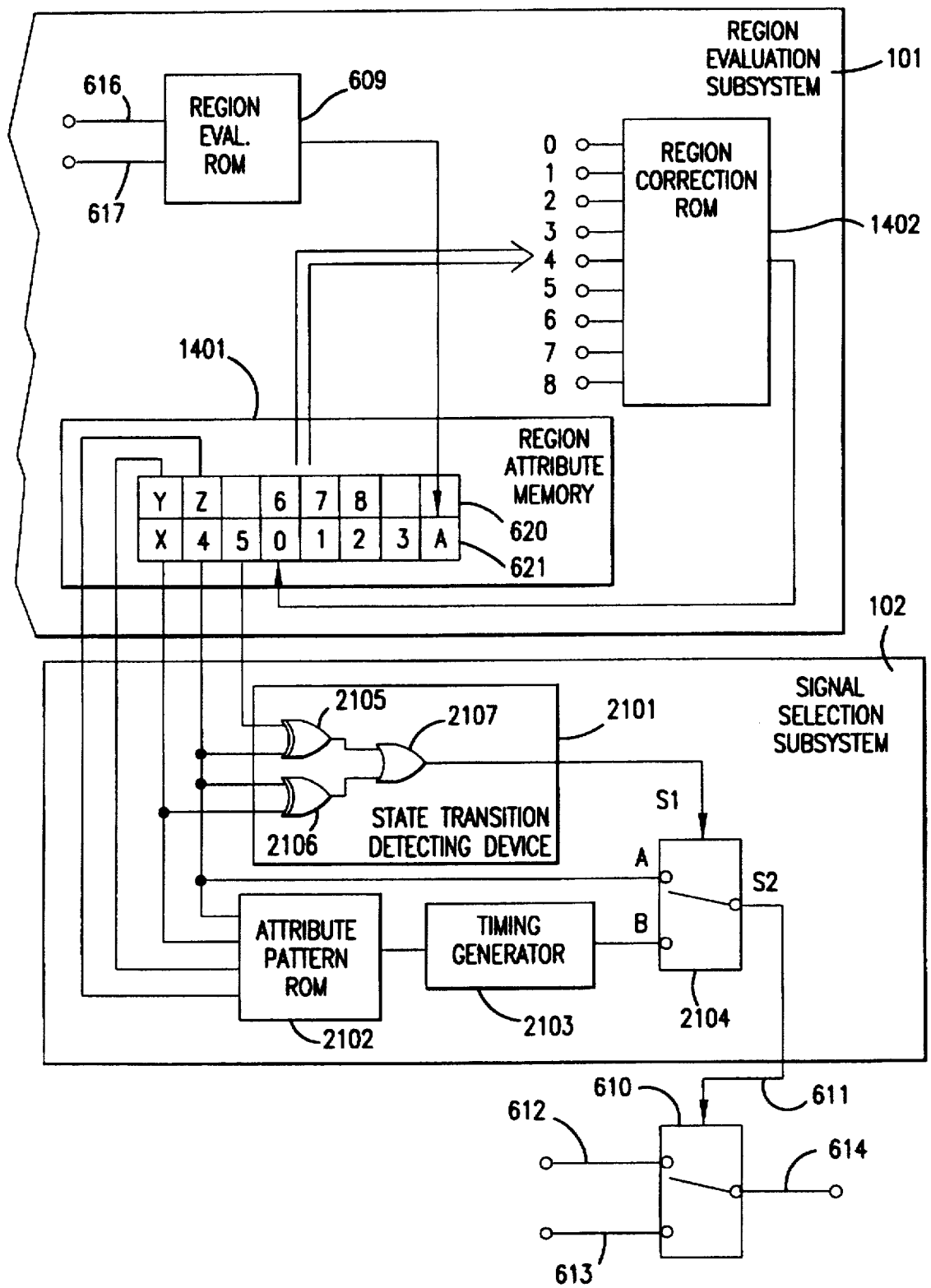
FIG. 31 is a block diagram of a fifth preferred embodiment of the image processing system comprising the second preferred embodiment of the region evaluation subsystem and the first preferred embodiment of the signal selection subsystem.

A fifth preferred embodiment of the image processing system 100 is shown in FIG. 31, and generally comprises the second preferred embodiment of the region evaluation subsystem 101 shown in FIG. 16 connected to the first preferred embodiment of the signal selection subsystem 102 shown in FIG. 24. Accordingly, since these subsystems and devices are fully described above, except as set forth below, any further discussion of these subsystems and devices is omitted.

As shown in FIG. 31, while the attribute pattern ROM 2102 and the state transition detecting device 2101 are connected to blocks of the region attribute memory 1401, the connected blocks differ from that of the third preferred embodiment shown in FIG. 24. That is, because the region correction ROM 1402 corrects the target block 0, the target block 0 is not stable. Thus, instead of using the target block 0 and its surrounding blocks 1–3 and X, as in the third preferred embodiment shown in FIG. 24, the state transition detecting device 2101 is connected to the blocks 4, 5 and X, which are all stable. Likewise, the attribute pattern ROM 2102 is connected to blocks 4 and X–Z, which are also all stable. Thus, the signal selection subsystem 102 outputs the selection signal to the binary signal switching unit 610 corresponding to block 4 while block 0 is corrected by the region correction ROM 1402.

It should be appreciated that either the second preferred embodiment of the region correction device 1402 shown in FIG. 17 or the third preferred embodiment of the region correction device 1402 shown in FIG. 22 can be used in place of the first preferred embodiment of the region correction device 1402 used in FIG. 31. However, in the fifth preferred embodiment shown in FIG. 31, since the region evaluation result is written into block "A" and the appropriate binary output is selected for block "4," the delay interval in the delay circuit 2 shown in FIGS. 19 and 20 corresponds to a 6-block portion delay interval.

Since multiple characteristic amounts are extracted from the multi-scaled input images and binary and continuous tone evaluations are performed from these multiple characteristic amounts, region evaluations are possible that are much more accurate than conventional region evaluation methods that do not use more than one characteristic amount. By transmitting binary converted image signals or continuous tone converted image signals according to the region evaluation results, optimum image processing can be accomplished for each region.

In addition, after regions are evaluated, if there are errors in the evaluated results, the errors of the evaluated results can be corrected by comparing the erroneously evaluated portions with the surrounding region attributes, thus making faster region divisions possible.

Furthermore, after regions are evaluated, a determination is made as to whether or not state transitions have occurred in the blocks. If state transitions have occurred, switching between binary conversion and continuous tone conversion is performed within those blocks based on the state transitions. Thus, in blocks for which state transitions have occurred, the entire blocks are not evaluated simply as either binary regions or continuous tone regions, but can instead switch between being treated as binary regions and continuous tone regions within the blocks based on the state transitions. Therefore, errors in the binary images which are ultimately output need not stand out noticeably. Moreover, the attribute correction and state transition detection methods and devices can be combined to obtain both advantages simultaneously.

Figure 32:
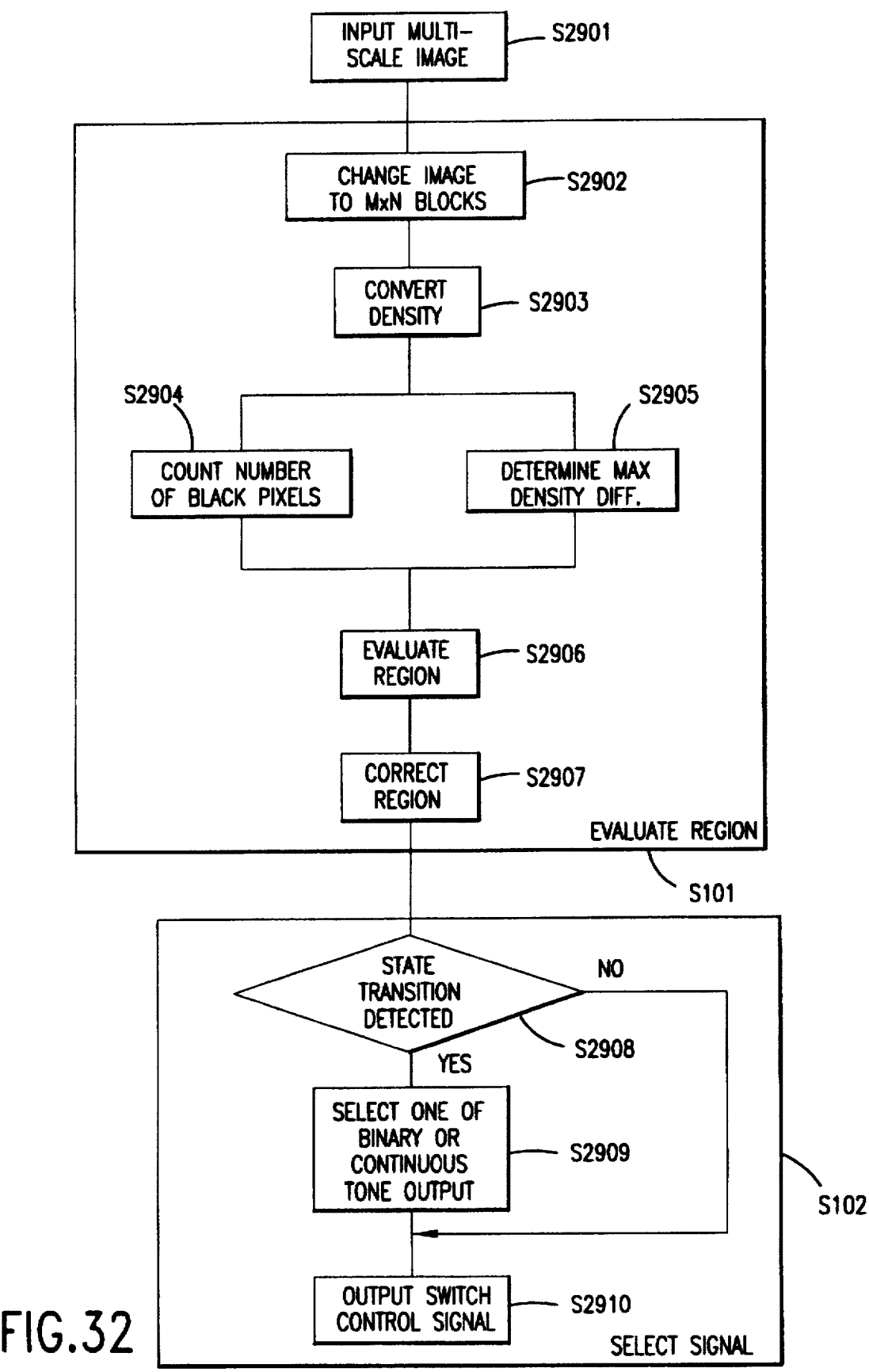
FIG. 32 is a flow chart outlining the second preferred embodiment of the region evaluation step used with the second preferred embodiment of the signal selection step.

FIG. 32 shows a flow chart outlining a sixth preferred embodiment for the image processing method, comprising the second preferred embodiment of the region evaluation process S101 and the second preferred embodiment of the signal selection process S102. Accordingly, as these processes are fully described with reference to FIGS. 12 and 27, any further discussion of these steps is omitted.

Figure 33:
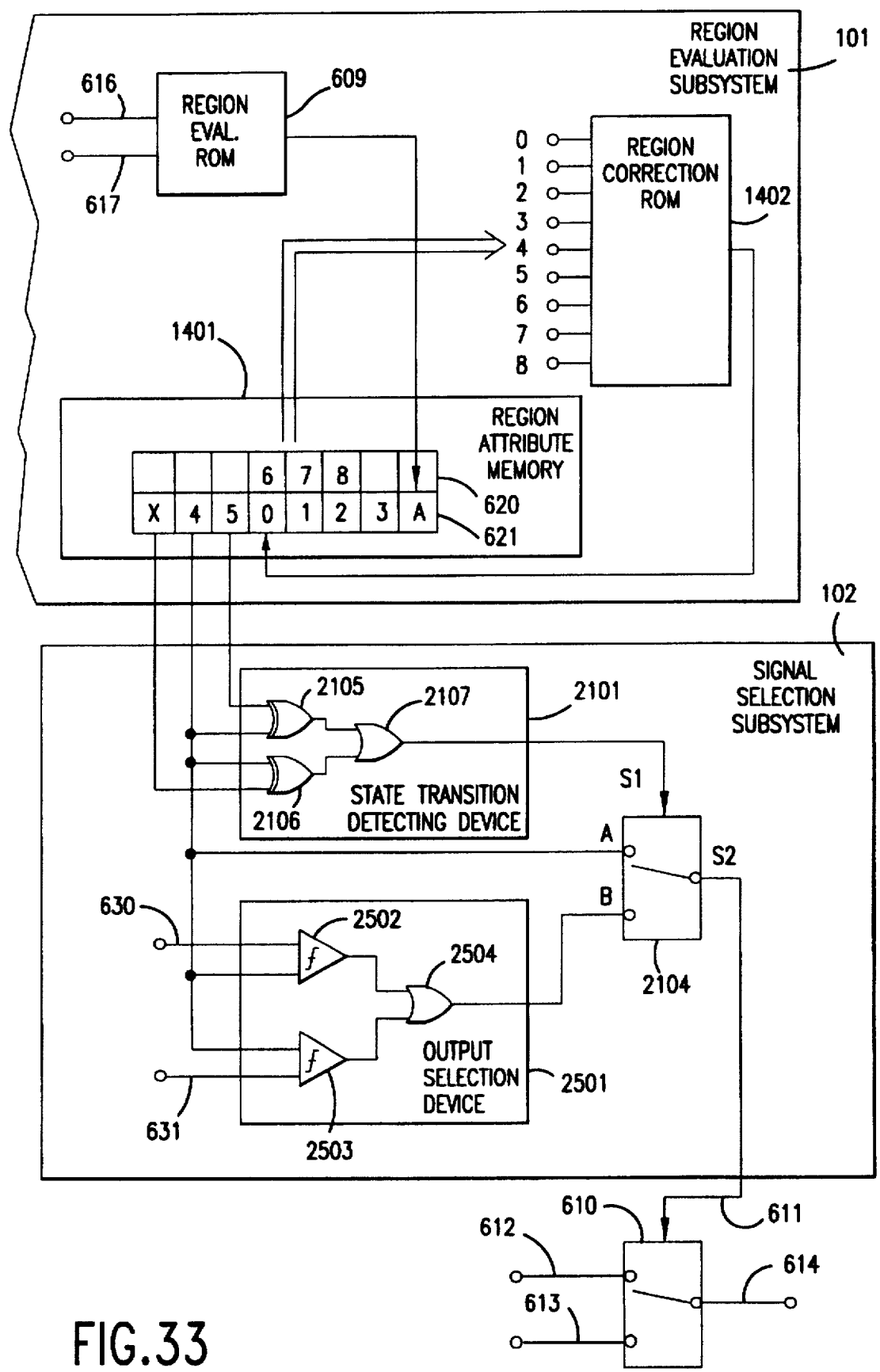
FIG. 33 is a block diagram of a sixth preferred embodiment of the image processing system comprising the second preferred embodiment of the region evaluation subsystem and the second preferred embodiment of the signal selection subsystem.

A sixth preferred embodiment of the image processing apparatus 100 is shown in FIG. 33, and generally comprises the second preferred embodiment of the region evaluation subsystem 101 shown in FIG. 16 connected to the second preferred embodiment of the signal selection subsystem 102 shown in FIG. 28. Accordingly, since these subsystems and devices are fully described above, except as set forth below, any further discussion of these subsystems and devices is omitted.

As shown in FIG. 33, while the attribute pattern ROM 2102 and the state transition detecting device 2101 are connected to blocks of the region attribute memory 1401, the connected blocks differ from that of the fourth preferred embodiment shown in FIG. 28. That is, because the region correction ROM 1402 corrects the target block 0, the target block 0 is not stable. Thus, instead of using the target block 0 and its surrounding blocks 1–3 and X, as in the fourth preferred embodiment shown in FIG. 28, the state transition detecting device 2101 is connected to the blocks 4, 5 and X, which are all stable. Likewise, the output procedure selecting circuit 2501 is connected to block 4, which is stable. Thus, the signal selection subsystem 102 outputs the selection signal to the binary signal switching unit 610 corresponding to block 4 while block 0 is corrected by the region correction ROM 1402.

It should be appreciated that either the second preferred embodiment of the region correction device 1402 shown in FIG. 17 or the third preferred embodiment of the region correction device 1402 shown in FIG. 22 can be used in place of the first preferred embodiment of the region correction device used in FIG. 33. However, in the sixth preferred embodiment shown in FIG. 33, since the region evaluation result is written into block "A" and the appropriate binary output is selected for block "4," the delay interval in the delay circuit 2 shown in FIGS. 19 and 20 corresponds to a 6-block portion delay interval.

Since multiple characteristic amounts are extracted from the multi-scaled input images and binary and continuous tone evaluations are performed from these multiple characteristic amounts, region evaluations are possible that are much more accurate than conventional region evaluation methods that do not use more than one characteristic amount. By transmitting binary converted image signals or continuous tone converted image signals according to the region evaluation results, optimum image processing can be accomplished for each region.

In addition, after regions are evaluated, if there are errors in the evaluated results, the errors of the evaluated results can be corrected by comparing the erroneously evaluated portions with the surrounding region attributes, thus making faster region divisions possible.

Furthermore, after regions are evaluated, a determination is made as to whether or not state transitions have occurred in the blocks. If state transitions have occurred, switching between binary conversion and continuous tone conversion is performed within those blocks based on the state transitions. Thus, in blocks for which state transitions have occurred, the entire blocks are not evaluated simply as either binary regions or continuous tone regions, but can instead switch between being treated as binary regions and continuous tone regions within the blocks based on the state transitions. Therefore, errors in the binary images which are ultimately output need not stand out noticeably. Moreover, the attribute correction and state transition detection methods and devices can be combined to obtain both advantages simultaneously.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image processing method for converting an input image having continuous tone regions and binary regions into a binary output image, comprising:

dividing the input image into a plurality of blocks;

extracting a plurality of different types of characteristic values for each block;

determining a block attribute for each block based on the extracted plurality of different types of characteristic values, the determined block attribute indicating whether the block is a continuous tone region or a binary region;

correcting, for at least one of the plurality of blocks, an erroneously determined block attribute erroneously determined by the block attribute determining step;

detecting whether a state transition occurs between the corrected block attributes of a current one of the plurality of blocks and surrounding blocks for each of the plurality of blocks;

selecting a conversion process for each block based on the determined block attribute, wherein the conversion process selecting step comprises:

selecting the conversion process based on the corrected block attribute of the current block when no state transition is detected by the state transition detecting step, and selecting the conversion process based on the detected state transition when a state transition is detected;

converting each block to a binary image output block using the selected conversion process for each block; and outputting the plurality of converted binary image output blocks as the binary output image.

2. An image processing method for converting an input image having continuous tone regions and binary regions into a binary output image, comprising:

dividing the input image into a plurality of blocks;

extracting a plurality of different types of characteristic values for each block;

determining a block attribute for each block based on the extracted plurality of different types of characteristic values, the determined block attribute indicating whether the block is a continuous tone region or a binary region;

detecting whether a state transition occurs between a current block and surrounding blocks for each of the plurality of blocks;

selecting a conversion process for each block based on the determined block attribute, comprising:

selecting the conversion process based on the determined block attribute when no state transition is detected for the current block by the state transition detecting step, and selecting the conversion process based on the detected state transition when a state transition is detected in the current block;

converting each block to a binary image output block using the selected conversion process for each block; and outputting the plurality of converted binary image output blocks as the binary output image.

3. The image processing method of claim 2, wherein selecting the conversion process based on the detected state transition comprises selecting between a continuous-tone conversion process and a binary conversion process based on the determined attributes of the current and surrounding blocks.

4. The image processing method of claim 2, wherein selecting the conversion process based on the detected state transition comprises selecting between a continuous-tone conversion process and a binary conversion process based on a density value for each pixel of the current block.

5. An image processing method for converting an input image having continuous tone regions and binary regions into a binary output image, comprising:

dividing the input image into a plurality of blocks;

extracting a plurality of different types of characteristic values for each block;

determining a block attribute for each block based on the extracted plurality of different types of characteristic values, the determined block attribute indicating whether the block is a continuous tone region or a binary region;

selecting a conversion process for each block based on the determined block attribute;

converting each block to a binary image output block using the selected conversion process for each block, comprising:

continuous-tone converting each block whose determined block attribute is a continuous tone attribute by gamma correcting each pixel of each block whose determined block attribute is a continuous tone attribute, and binary converting each block whose determined block attribute is a binary attribute; and outputting the plurality of converted binary image output blocks as the binary output image.

6. The image processing method of claim 5, wherein the gamma correcting step comprises:

eliminating each pixel having a density below a first non-sensitive density;

eliminating each pixel having a density above a second non-sensitive density; and correcting the density of each remaining pixel to conform to characteristics of a selected output device.

7. An image processing method for converting an input image having continuous tone regions and binary regions into a binary output image, comprising:

dividing the input image into a plurality of blocks comprising:

dividing the input image into a plurality of first blocks 1 pixel wide and 1 pixel high, and forming second blocks M pixels wide and N pixels high around each first block;

extracting a plurality of characteristic values for each block, the plurality of characteristic values extracting step comprising:

determining a number of black pixels for each second block, and determining a maximum density difference for each second block;

determining a block attribute for each block based on the extracted plurality of characteristic values, the determined block attribute indicating whether the block is a continuous tone region or a binary region;

selecting a conversion process for each block based on the determined block attribute;

converting each block to a binary image output block using the selected conversion process for each block; and outputting the plurality of converted binary image output blocks as the binary output image.

8. An image processing system for converting an input image having continuous tone regions and binary regions into a binary output image, the system comprising:

an image memory that stores the input image;

a block evaluation system that inputs a current block of the input image and outputting a region attribute value for the current block, wherein the block evaluation system comprises a plurality of characteristic value extraction devices, each extraction device extracting a different type of characteristic value from the current block, the block evaluation system determining the block attribute for the current block based on the plurality of different types of extracted characteristic values;

a continuous tone processing system that inputs the current block of the input image from the image memory and outputting a continuous-tone-converted binary image output block;

a binary processing system that inputs the current block of the input image from the image memory and outputting a binary-converted binary image output block;

a block attribute correction device that corrects the determined block attribute for the current block to a corrected block attribute based on the determined attributes of the current block and surrounding blocks adjacent to the current block;

a state transition detecting system that detects a state transition between the corrected block attributes of the current block and the surrounding blocks;

a binary output signal selection system, the state transition detecting device outputting a state transition detection signal to the binary output signal selection system, the binary output signal selection system selecting one of the continuous-tone-converted binary image output block and the binary-converted binary image output block for the current block based on the original or corrected block attribute output by the block attribute correction device for the current block and the state transition signal, wherein:

when the state transition detection signal indicates a state transition is detected, the binary output signal selection system selects between the continuous-tone-converted output block and the binary-converted output block based on the detected state transition, and when the state transition detecting signal indicates a state transition is not detected, the binary output signal selection system selects between the continuous-tone-converted output block and the binary-converted output block based on the corrected block attribute of the current block.

9. An image processing system for converting an input image having continuous tone regions and binary regions into a binary output image, the system comprising:

an image memory that stores the input image;

a block evaluation system that inputs a current block of the input image and outputting a region attribute value for the current block, wherein the block evaluation system comprises a plurality of characteristic value extraction devices, each extraction device extracting a different type of characteristic value from the current block, the block evaluation system determining the block attribute for the current block based on the plurality of different types of extracted characteristic values;

a continuous tone processing system that inputs the current block of the input image from the image memory and outputting a continuous-tone-converted binary image output block;

a binary processing system that inputs the current block of the input image from the image memory and outputting a binary-converted binary image output block;

a block attribute correction device that corrects the determined block attribute for the current block to a corrected block attribute based on the determined attributes of the current block and surrounding blocks adjacent to the current block, wherein the block attribute correction device comprises:

a plurality of pattern matching circuit components, a connection circuit selectively connecting the block attributes of the current and surrounding blocks to each of the plurality of pattern matching circuit components, a logic circuit logically combining outputs of the pattern matching circuit components and the block attribute for the current block and outputting the corrected block attribute for the current block, and means for overwriting the determined block attribute for the current block with the corrected block attribute; and a binary output signal selection system that selects one of the continuous-tone-converted binary image output block and the binary-converted binary image output block for the current block based on the original or corrected block attribute output by the block attribute correction device for the current block.

10. An image processing system for converting an input image having continuous tone regions and binary regions into a binary output image, the system comprising:

an image memory for storing the input image;

a block evaluation system inputting a current block of the input image and outputting a region attribute value for the current block, wherein the block evaluation system comprises a plurality of characteristic value extraction devices, each extraction device extracting a different type of characteristic value from the current block, the block evaluation system determining the block attribute for the current block based on the plurality of different types of extracted characteristic values;

a continuous tone processing system inputting the current block of the input image from the image memory and outputting a continuous-tone-converted binary image output block;

a binary processing system inputting the current block of the input image from the image memory and outputting a binary-converted binary image output block;

a state transition detecting system detecting a state transition between the block attributes of a current block and surrounding blocks adjacent to the current block; and a binary output signal selection system, the state transition detecting system outputting a state transition detection signal to the binary output signal selection system, the binary output signal selection system selecting one of the continuous-tone-converted binary image output block and the binary-converted binary image output block for the current block based on the original or corrected block attribute output by the block attribute correction device for the current block, wherein:

when the state transition detection signal indicates a state transition is detected, the binary output signal selection system selects between the continuous-tone-converted output block and the binary-converted output block based on the detected state transition, and when the state transition detecting signal indicates a state transition is not detected, the binary output signal selection system selects between the continuous-tone-converted output block and the binary-converted output block based on the determined block attribute of the current block.

11. The image processing system of claim 10, wherein, when the state transition detection signal indicates a state transition is detected, the binary output signal selection system selects between the continuous-tone-converted output block and the binary-converted output block based on the determined attributes of the current and surrounding blocks.

12. The image processing system of claim 10, wherein, when the state transition detection signal indicates a state transition is detected, the binary output signal selection system selects between the continuous-tone-converted output block and the binary-converted output block based on a density value for each pixel of the current block.

13. The image processing system of claim 10, wherein the state transition detecting system comprises:

a state transition detection circuit that inputs block attributes of the current block and a first plurality of surrounding blocks adjacent to the current block and that outputs a detection signal based on the block attributes of the current block and the first plurality of surrounding blocks;

an attribute pattern memory that inputs block attributes of the current block and a second plurality of surrounding blocks adjacent the current block as an input address and outputting an attribute pattern signal;

a timing generator that generates a plurality of transition block attributes for portions of the current block; and a block attribute selection switch that selectively outputs one of the block attribute for the current block and the plurality of transition block attributes to the binary output signal selection system based on the detection signal output by the state transition detection circuit.

14. The image processing system of claim 10, wherein the state transition detecting system comprises:

a state transition detection circuit that inputs block attributes of the current block and the plurality of surrounding blocks adjacent to the current block and that outputs a detection signal based on the block attributes of the current block and the plurality of surrounding blocks;

an output selection circuit that compares each pixel of the current block, on a pixel-by-pixel basis, to a first threshold value and a second threshold value and outputting a comparison signal indicating the comparison result for each pixel; and a block attribute selection switch that selectively outputs one of the block attribute for the current block and the comparison signal to the binary output signal selection system based on the detection signal output by the state transition detection circuit.

15. The image processing system of claim 14, wherein the output selection circuit comprises:

a first comparator that compares the block attribute of the current block to the first threshold value and outputting a first comparison signal;

a second comparator that compares the block attribute of the current block to the second threshold value and outputting a second comparison signal; and a logic circuit that logically combines the first and second comparison signals and outputting the comparison signal.

16. An image processing system for converting an input image having continuous tone regions and binary regions into a binary output image, the system comprising:

an image memory that stores the input image;

a block evaluation system that inputs a current block of the input image and that outputs a region attribute value for the current block, wherein the block evaluation system comprises a plurality of characteristic value extraction devices, each extraction device extracting a different type of characteristic value from the current block, the block evaluation system determining the block attribute for the current block based on the plurality of different types of extracted characteristic values;

a continuous tone processing system that inputs the current block of the input image from the image memory and that outputs a continuous-tone-converted binary image output block, wherein the continuous tone processing system comprises a gamma correction circuit that gamma corrects each pixel of each block;

a binary processing system that inputs the current block of the input image from the image memory and that outputs a binary-converted binary image output block; and a binary output signal selection system that selects one of the continuous-tone-converted binary image output block and the binary-converted binary image output block for the current block based on the block attribute output by the block evaluation system for the current block.

17. The image processing method of claim 16, wherein the gamma correction circuit comprises a memory that stores a gamma correction curve, an input density value of a pixel input as an address to the memory, the memory outputting a gamma-corrected density value for the pixel.

18. The image processing method of claim 17, wherein the gamma correction curve comprises:

a first non-sensitive region wherein, when the input density value for the pixel is below a first value, the gamma-corrected density value is set to a first non-sensitive value;

a second non-sensitive region wherein, when the input density value for the pixel is above a second value, the gamma-corrected density value is set to a second non-sensitive value; and a sensitive region wherein, when the input density value for the pixel is between the first and second values, the gamma-corrected density value is set to conform to characteristics of a selected output device.

19. An image processing system for converting an input image having continuous tone regions and binary regions into a binary output image, the system comprising:

an image memory that stores the input image;

a block evaluation system that the input image on a pixel-by-pixel basis, the input image divided into a plurality of first blocks 1 pixel wide and 1 pixel high, and that outputs a region attribute value for a current first block, wherein:

the input image is divided into a plurality of second blocks M pixels wide and N pixels high around each first block, and the block evaluation system comprises a plurality of characteristic value extraction devices, each extraction device extracting a different type of characteristic value from the current block, the plurality of characteristic value extraction devices comprising:

a pixel density counter that determines a distribution of pixels of each second block relative to a threshold pixel density, and a density difference detector that detects a maximum pixel density difference between a most dense pixel and a least dense pixel of the pixels of each second block, and the block evaluation system determines the block attribute for the current block based on the plurality of different types of extracted characteristic values;

a continuous tone processing system that inputs the current block of the input image from the image memory and that outputs a continuous-tone-converted binary image output block;

a binary processing system that inputs the current block of the input image from the image memory and that outputs a binary-converted binary image output block; and a binary output signal selection system that selects one of the continuous-tone-converted binary image output block and the binary-converted binary image output block for the current block based on the block attribute output by the block evaluation system for the current block.

* * * * *